(12) United States Patent
Wang et al.

(10) Patent No.: US 11,699,191 B2
(45) Date of Patent: *Jul. 11, 2023

(54) SYSTEMS, METHODS, AND PLATFORMS FOR AUTOMATED QUALITY MANAGEMENT AND IDENTIFICATION OF ERRORS, OMISSIONS AND/OR DEVIATIONS IN COORDINATING SERVICES AND/OR PAYMENTS RESPONSIVE TO REQUESTS FOR COVERAGE UNDER A POLICY

(71) Applicant: Futurity Group, Inc., Chicago, IL (US)

(72) Inventors: John Wang, Walnut Creek, CA (US); Michael Cummings, Hingham, MA (US); Hari Nathan, Santa Clara, CA (US); Ching Lau, Arcadia, CA (US)

(73) Assignee: Futurity Group, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/192,373

(22) Filed: Mar. 4, 2021

(65) Prior Publication Data

US 2022/0028006 A1  Jan. 27, 2022

Related U.S. Application Data

(63) Continuation of application No. 16/720,460, filed on Dec. 19, 2019, now Pat. No. 10,977,738.
(Continued)

(51) Int. Cl.
*G06Q 40/08* (2012.01)
*G06N 20/00* (2019.01)

(52) U.S. Cl.
CPC ............ *G06Q 40/08* (2013.01); *G06N 20/00* (2019.01)

(58) Field of Classification Search
CPC .................................................. G06Q 40/08
See application file for complete search history.

(56) References Cited

U.S. PATENT DOCUMENTS

| 9,792,656 | B1 | 10/2017 | Konrardy et al. |
| 10,007,717 | B2 | 6/2018 | Zhang et al. |

(Continued)

FOREIGN PATENT DOCUMENTS

| EP | 4040330 | 8/2022 | | |
| KR | 20190063175 A | * | 6/2019 | ............. G06N 3/088 |

(Continued)

OTHER PUBLICATIONS

U. Srinivasan and B. Arunasalam, "Leveraging Big Data Analytics to Reduce Healthcare Costs," in IT Professional, vol. 15, No. 6, pp. 21-28, Nov.-Dec. 2013, doi: 10.1109/MITP.2013.55. (Year: 2013).*

(Continued)

*Primary Examiner* — Virpi H Kanervo
(74) *Attorney, Agent, or Firm* — Gardella Grace P.A.

(57) ABSTRACT

In an illustrative embodiment, systems and methods for monitoring insurance claims include identifying, based on predetermined monitoring frequency, insurance claims identified for vulnerability detection processing. Vulnerability detection features may be extracted from data files of the claims, which provide an indication of claim handling deficiencies that can cause claim leakage. A trained vulnerability detection data model can be used to detect claim handling vulnerabilities within the extracted vulnerability detection features where each of the vulnerabilities may include a likelihood of the vulnerability resulting in claim leakage. The vulnerability detection data model may be trained with a data set customized to a respective insurance provider for each claim. Vulnerability scores indicating an overall likelihood of claim leakage can be calculated for the claims based on the detected claim handling vulnerabilities.

(Continued)

Vulnerability scores for claims assigned to a user may be presented within a user interface screen at a remote computing device.

18 Claims, 21 Drawing Sheets

Related U.S. Application Data

(60) Provisional application No. 62/785,539, filed on Dec. 27, 2018.

(56) References Cited

U.S. PATENT DOCUMENTS

| | | | |
|---|---|---|---|
| 10,332,210 | B1 | 6/2019 | Kemp et al. |
| 10,977,738 | B2 | 4/2021 | Wang et al. |
| 2003/0028404 | A1 | 2/2003 | Herron et al. |
| 2003/0120588 | A1 | 6/2003 | Dodd et al. |
| 2005/0246206 | A1* | 11/2005 | Obora .............. G06Q 10/10 705/4 |
| 2006/0026157 | A1 | 2/2006 | Gupta et al. |
| 2011/0125648 | A1 | 5/2011 | Price et al. |
| 2015/0081324 | A1 | 3/2015 | Adjaoute |
| 2015/0127370 | A1 | 5/2015 | Cornelis |
| 2016/0012544 | A1 | 1/2016 | Ramaswamy et al. |
| 2016/0267396 | A1* | 9/2016 | Gray ................ G06N 20/00 |
| 2019/0279306 | A1* | 9/2019 | Wassel ............. G06Q 40/08 |
| 2020/0211120 | A1 | 7/2020 | Wang et al. |
| 2020/0272938 | A1 | 8/2020 | Desmond et al. |
| 2020/0394364 | A1 | 12/2020 | Venkateshwaran et al. |
| 2022/0019730 | A1 | 1/2022 | Sharma et al. |
| 2022/0253942 | A1 | 8/2022 | Wang et al. |

FOREIGN PATENT DOCUMENTS

| | | | |
|---|---|---|---|
| WO | WO-0198914 A1 * | 12/2001 | ............ G06Q 10/10 |
| WO | 2020139917 | 7/2020 | |

OTHER PUBLICATIONS

U. Srinivasan and B. Arunasalam, "Leveraging Big Data Analytics to Reduce Healthcare Costs," in IT Professional, vol. 15, No. 6, pp. 21-28, Nov.-Dec. 2013. (Year: 2013).*

International Search Report and Written Opinion for International Application No. PCT/US2019/068531 dated Mar. 11, 2020. (Previously submitted in related U.S. Appl. No. 16/720,460).

Non-Final Office Action issued in U.S. Appl. No. 16/720,460 dated Mar. 10, 2020.

Final Office Action issued in U.S. Appl. No. 16/720,460 dated Aug. 3, 2020.

Notice of Allowance issued in U.S. Appl. No. 16/720,460 dated Dec. 9, 2020.

International Preliminary Report on Patentability for International Application No. PCT/US2019/068531 dated Jul. 8, 2020.

Agarwal et al., "Automatic problem extraction and analysis from unstructured text in IT tickets," IBM Journal of Research and Development 61.1.4: 41-52 (2017).

Paramesh et al., "Classifying the unstructured IT service desk tickets using ensemble of classifiers," 3rd International Conference on Computational Systems and Information Technology for Sustainable Solutions, IEEE, p. 221-226 (2018).

Notice of Allowance mailed in U.S. Appl. No. 17/666,001 dated Aug. 11, 2022.

European Search Report issued in EP Application No. 19904759.8 dated Mar. 30, 2022.

Non-Final Office Action mailed in U.S. Appl. No. 17/666,001 dated Apr. 27, 2022.

* cited by examiner

| Column | Common | Normalization Difficulty | Normalization Method |
|---|---|---|---|
| Category Indicator | Yes | Simple | Map to Y/N |
| Claim Type | Yes | Medium | Remove abbreviations |
| External Adjuster | Yes | Simple | Map to Y/N |
| Insured Name | Encodable | Simple | Target Mean |
| Jurisdiction | Yes | Unnecessary | N/A |
| Litigation Status Indicator | Yes | Simple | Map to Y/N |
| Loss - Indemnity | Yes | Simple | Convert to text |
| Loss - Medical | Yes | Simple | Convert to text |
| Loss - Reserve Total | Yes | Simple | Convert to text |
| Loss - Total | Yes | Simple | Convert to text |
| Loss - Type | Yes | Medium | Remove abbreviations |
| Office Code | Encodable | Simple | Target Mean |
| Opened Date | Yes | Simple | Convert to datetime |
| Policy Number | Encodable | Medium | Target Mean |
| Policy Type | Yes | Medium | Remove abbreviations |
| Claim Representative | Encodable | Simple | Target Mean |
| Salvage Items Indicator | Yes | Simple | Map to Y/N |
| Salvage Total | Yes | Simple | Convert to text |
| Status | Yes | Simple | Map values |
| Subrogation Qualification Indicator | Yes | Simple | Map to Y/N |
| Subrogation Total | Yes | Simple | Convert to text |
| Supervisor Code | Encodable | Simple | Target Mean |
| Unit Code | Encodable | Simple | Target Mean |
| Loss Description | Yes | Unnecessary | N/A |

FIG. 3

| Vulnerability Metrics | Leakage Likelihood |
|---|---|
| Claim Assignment | Medium |
| Contact | High |
| Coverage | Critical |
| Investigation | High |
| Evaluation | High |
| Reserves | High |
| Litigation Management | High |
| Negotiations and Settlement | High |
| Recovery | High |
| File Administration | Low |
| Vendor Management | Medium |
| Compliance | High |
| Supervision | Medium |

FIG. 4

| Inpoint ClaimsMonitor.X™ | | | | | | ⚙ Support  ClaimsMonitor  ⬭ Log out |
|---|---|---|---|---|---|---|
| ☰ Filter [Issue Priority ⌄] [Supervisor ⌄] | | | | | | 🔍 Search by Claim # |
| Claim # ▼ | Issue Priority ▼ | Line Of Business ▼ | Coverage Code ▼ | Adjuster ▼ | Supervisor ▼ | Open Date ▼ | Loss Date ▼ | Days Open ▼ | Exposure Type ▼ |

| Claim # ▼ | Issue Priority ▼ | Line Of Business ▼ | Coverage Code ▼ | Adjuster ▼ | Supervisor ▼ | Open Date ▼ | Loss Date ▼ | Days Open ▼ | Exposure Type ▼ |
|---|---|---|---|---|---|---|---|---|---|
| AL06445 | ◉ HIGH | CL AUTO | AUTO COMB SNG LIMIT | Jxxxxx XxxxxxR | Dxxxx XxxT | 08/30/2018 | 08/29/2018 | 341 | ABI |
| AL01844 | ○ LOW | PL AUTO | COLLISION | Mxxxx XxxxxxE | Acxxx XxxxxxN | 08/14/2018 | 08/10/2018 | 357 | ABI |
| AL01559 | ○ LOW | PL AUTO | COLLISION | Vxxxx XxxxxxxA | Axxxx XxxxxxN | 08/13/2018 | 08/06/2018 | 358 | ABI |
| AL99489 | ◉ HIGH | PL AUTO | COLLISION | Mxxxx XxxxxxE | Axxxx XxxxxxN | 08/03/2018 | 08/02/2018 | 368 | ABI |
| AL83954 | ◉ HIGH | PL AUTO | PROP DAM | Pxxx XxxxR | Axxxx XxxxxxxT | 06/11/2018 | 06/10/2018 | 421 | APD |
| AL73094 | ⊘ MEDIUM | PL AUTO | COLLISION | Jxxxxx XxxxxZ | Jxxxxxxx XxxxxxT | 04/18/2018 | 04/17/2018 | 475 | ABI |
| AL69919 | ◉ HIGH | PL AUTO | COLLISION | Kxxxxx XxxxxL | Axxx XxxxR | 04/04/2018 | 03/29/2018 | 489 | ALL |
| AL52849 | ⊘ MEDIUM | PL AUTO | COLLISION | Bxxxxx XxxxxR | Axxxx XxxxxxxN | 01/03/2018 | 12/31/2017 | 580 | APD |
| AL52820 | ○ LOW | PL AUTO | COLLISION | Jxxxxx XxxxxxY | Axxxx XxxxxxxN | 01/03/2018 | 12/29/2017 | 580 | ALL |

Download Report  Data last uploaded on Mar 06, 2019 06AM

Inpoint ClaimsMonitor X™

← Back

⊕ Claim #: AK99237

| Line of Business | Coverage Code | Open Date | Insured Name | Loss Date | Loss Description |
|---|---|---|---|---|---|
| CL AUTO | AUTO COMBI SNG LIMIT | 10/06/2019 | WX.XX XXXX XXXXXX, XXc | 10/03/2019 | IV STRUCK PARKED & UNOCCUPIED OV. |

| Claimant-Exposure Type | Feature # | | | Days Open | Adjuster |
|---|---|---|---|---|---|
| LXXT - APD | 10030ZKVHCXMC3J3368ALJONE | | | 25 | BXXX.XXX XXXXX5 |

Reserve: $750.00
Expenses: $0.00
Paid Loss: $0.00

○ HIGH

Alerts

| PHASE | LEADING PRACTICE QUESTION | ISSUE LIKELIHOOD | POTENTIAL ISSUES | SUPERVISOR | ACTIONS |
|---|---|---|---|---|---|
| Contact | Were initial contacts with all pertinent parties achieved? | ◎ HIGHLY LIKELY | Contact attempt not made with insured | DXXX.XXT | ✎ Review and Complete  💬 Add Comments |

542 — PHASE
544 — LEADING PRACTICE QUESTION
546 — ISSUE LIKELIHOOD
548 — POTENTIAL ISSUES
550 — SUPERVISOR
552 — Review and Complete
554 — Add Comments Download Record | Data last uploaded on Oct 13, 2019 12PM

SYSTEMS, METHODS, AND PLATFORMS FOR AUTOMATED QUALITY MANAGEMENT AND IDENTIFICATION OF ERRORS, OMISSIONS AND/OR DEVIATIONS IN COORDINATING SERVICES AND/OR PAYMENTS RESPONSIVE TO REQUESTS FOR COVERAGE UNDER A POLICY

CROSS-REFERENCE TO RELATED APPLICATIONS

This application is a continuation of and claims priority to U.S. patent application Ser. No. 16/720,460, entitled "Systems, Methods, and Platforms for Automated Quality Management and Identification of Errors, Omissions and/or Deviations in Coordinating Services and/or Payments Responsive to Requests for Coverage Under a Policy" filed Dec. 19, 2019 which claims priority to U.S. Provisional Patent Application Ser. No. 62/785,539 entitled "Systems, Methods, and Platforms for Automated Quality Management and Identification of Errors, Omissions and/or Deviations in Coordinating Services and/or Payments Responsive to Requests for Coverage Under a Policy" filed Dec. 27, 2018. All above identified applications are hereby incorporated by reference in their entireties.

SUMMARY OF ILLUSTRATIVE EMBODIMENTS

The forgoing general description of the illustrative implementations and the following detailed description thereof are merely exemplary aspects of the teachings of this disclosure and are not restrictive.

In some embodiments, systems and methods for monitoring insurance claims include identifying, based on predetermined monitoring frequency, insurance claims due for vulnerability detection processing. Vulnerability detection features may be extracted from data files of the claims, which provide an indication of claim handling deficiencies that can cause claim leakage. A trained vulnerability detection data model can be used to detect claim handling vulnerabilities within the extracted vulnerability detection features where each of the vulnerabilities may include a likelihood of the vulnerability resulting in claim leakage. The vulnerability detection data model may be trained with a data set customized to a respective insurance provider for each claim. Vulnerability scores indicating an overall likelihood of claim leakage can be calculated for the claims based on the detected claim handling vulnerabilities. Vulnerability scores for claims assigned to a user may be presented within a user interface screen at a remote computing device.

In some embodiments, the claims monitoring system may include a feedback mechanism that allows provides automatic oversight for tracking resolutions to identified vulnerabilities within claims and generating performance information for claims handlers that can be used by supervisors. In some embodiments, the feedback mechanism may increase a frequency of vulnerability detection processing of open claims that have been identified as having a high risk for leakage due to previously detected vulnerabilities. In some examples, claims that as having a high risk for leakage are processed and evaluated for vulnerabilities more frequently than claims that have a medium or low risk of leakage.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 3 is a table of targeted claim features for a claim monitoring system;

FIG. 4 is a table of vulnerability metric categories for detecting vulnerabilities associated with claim leakage;

FIGS. 5A-5C illustrate user interface screens for providing detected claim vulnerability information to an insurance provider;

FIGS. 6-12 illustrate user interface screens for providing detected claim vulnerability information to an insurance provider;

DETAILED DESCRIPTION OF ILLUSTRATIVE EMBODIMENTS

Figure 1:
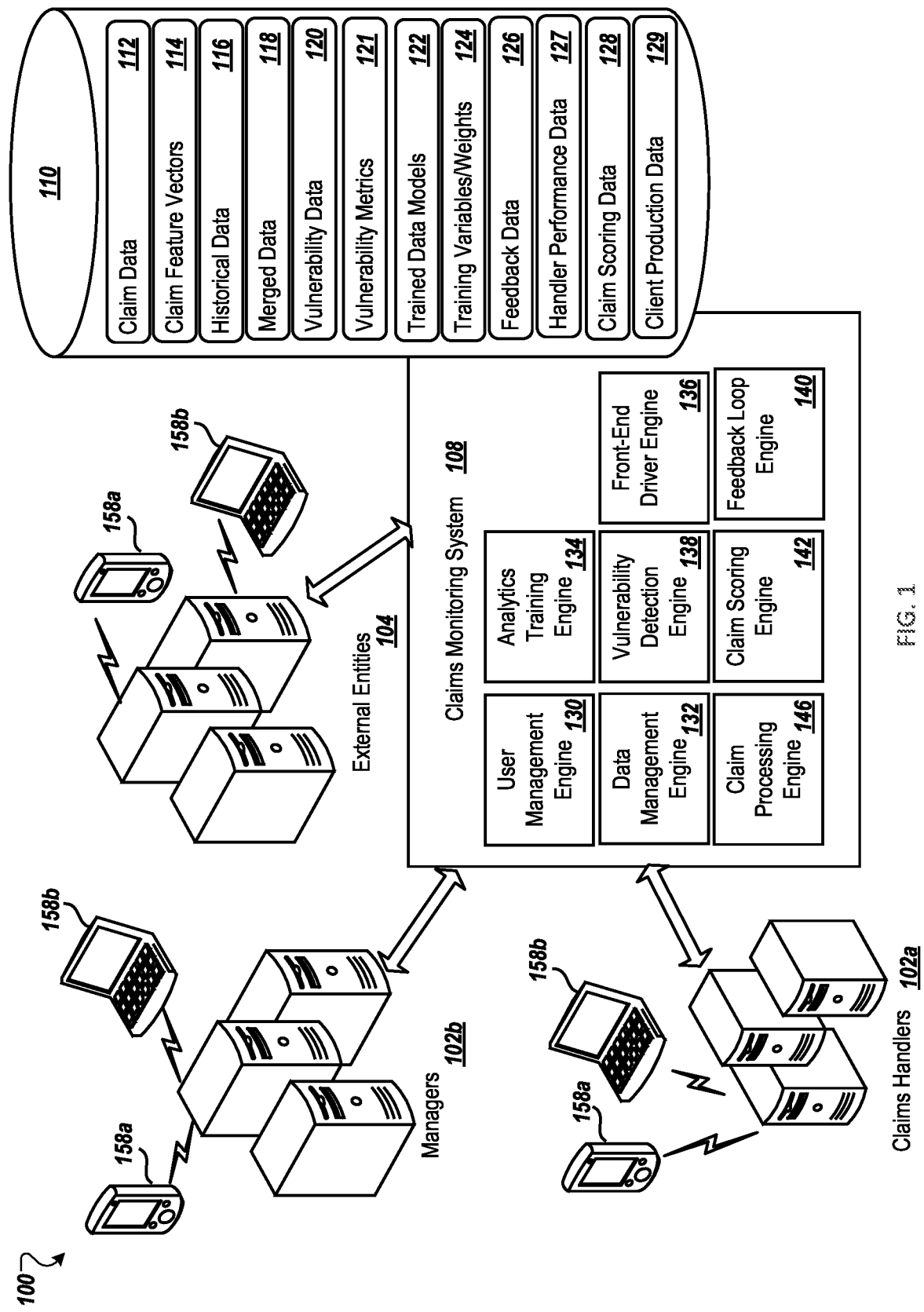
FIG. 1 is a block diagram of an example environment for a claims monitoring system.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Insurance providers employ quality assurance managers and front-line managers to monitor how insurance claims are handled within their organizations to reduce the amount of claim leakage (money that is lost due to claims management inefficiencies caused by failures to follow existing policies and procedures related to claims handling) that occurs. However, each of these managers often have hundreds or thousands of claims under their supervision, which makes it impossible to conduct thorough reviews of all open claims. Therefore, managers only review small samples of open claims, making providers vulnerable to leakage from unreviewed claims. Further, the managers performing manual reviews rely on their intuition to detect vulnerabilities and deficiencies within the claims, which may not be an accurate reflection of the true causes of claim leakage. Additionally, performing audits of closed insurance claims is both labor and time intensive (about 6-8 weeks). As a result, closed claim file audits are conducted infrequently, which delays the value that can be created through the lessons learned for how to identify root causes of leakage and mishandling of claims.

Aspects of the present disclosure are directed to computing systems and methods for monitoring insurance claims to identify vulnerabilities that can cause inefficiencies with the claims handling process. In some implementations, claims handling personnel for an insurance carrier interact with a computing system to provide documentation associated with an insurance claim, which can include both structured and unstructured data. For example, the structured data can include data input directly to the system that can be organized and stored in a relational database (e.g., insurance policy information, dates and times of when a claimant was contacted, official medical diagnoses). Unstructured data can include any information from complex data sources that are stored in multiple formats (e.g., notes regarding any calls or interactions with a claimant, medical professional, law enforcement professional, or vehicle inspector, receipts, police reports, medical records, automobile inspection reports for automobile insurance claims). Because the claims monitoring system can extract targeted features from both the structured and unstructured claim data by efficiently locating and extracting the targeted features from data sources in multiple formats, the system's ability to identify claim leakage is significantly improved because the data is not just limited to structured data.

Based on the information provided, in some examples, the claims monitoring system can process the documentation and data for open claims to identify weaknesses or vulnerabilities in the claims handling process that can lead to claim leakage, which is an amount of money that is lost due to claims management inefficiencies caused by failures to follow existing policies and procedures related to claims handling. In some examples, the money lost from claims management inefficiencies manifests as litigation costs that could have been mitigated if the proper claims handling processes had been followed or as loss of clients due to poor claims handling services. Examples of vulnerability issues that can lead to claim leakage are failing to call a party to a claim within a timely fashion, failing to identify possible coverage issues, failing to refer a claim to counsel at an appropriate time, and failing to obtain appropriate documentation for the claim. In some examples, the claims monitoring system may also process closed claims to identify vulnerabilities within the closed claims that can be used by the computing system to adaptively learn which characteristics of claims lead to negative outcomes that cause leakage.

The claims monitoring system, in some implementations, trains a machine learning data model to identify claim vulnerabilities using one or more data sets that have been customized to the client's own business practices and claims handling interactions with customers. In some examples, the system processes closed claims for the client to extract features related to how the client processes claims to generate a client data set. The client data set, in one example, is normalized and merged with a historical data from multiple data sources to produce a customized data set for the client. In some examples, the system trains the data model with the merged data set for a particular client and a targeted set of weighted training variables related to proactively identifying claims vulnerabilities. In some examples, the training variables are weighted based on a relative importance of each of the variables to identifying a particular type of claim leakage.

The system, in some embodiments, identifies vulnerabilities for a set of open claims by applying the trained data model to extracted features of the open claims. In some implementations, the trained data model provides the system with learned machine knowledge about how to extract valuable features from the unstructured data in the insurance claims. For example, based on the trained model, the claims monitoring system can identify key phrases used by claims handlers, medical professionals, law enforcement officers, vehicle inspectors, and others providing claims documentation that can be used to identify features of the claims related to potential vulnerabilities based on how they are used relative to the key features. The claims monitoring system, in some examples, can use the trained data model to predict, based on the identified features of the open claim, a likelihood that one or more vulnerability issues has occurred. The system may also score each open claim based on its likelihood of leakage occurring. In some embodiments, the system issues notifications to claims handling supervisors when vulnerabilities are identified so that the claims handlers can rectify any of the identified vulnerabilities before claim leakage occurs.

In some implementations, the claims monitoring system can also include a closed feedback loop that performs in-process validation of resolutions of identified claim vulnerabilities. For example, the system may increase a frequency of vulnerability detection processing of open claims that have been identified as having a high risk for leakage due to previously detected vulnerabilities. In other examples, the system may rank or score the performance of each claims handler for an insurance carrier based on a number or percentage of claim vulnerabilities that are detected within a claim or set of claims assigned to a respective claims handler. In some examples, each claims handler may be ranked relative to other claims handlers associated with an insurance carrier or relative to claims handlers with a similar amount of experience or seniority within the organization. The claims monitoring system, in some examples, may increase the frequency of processing claims assigned to a claims handler whose performance, as evidenced by the performance score or ranking, is below that of the other claims handlers in the organization or below that of other claims handlers with similar experience.

The implementations of the present disclosure provided herein are a significant improvement over manual, conventional methods of claims monitoring and are necessarily rooted in computer technology. Conventional claims monitoring systems rely upon manual file reviews by quality assurance and front-line managers. Because each of these managers often have hundreds or thousands of claims under their supervision, it is impossible for them to conduct thorough reviews of all open claims. Therefore, managers only review small samples of open claims, making providers vulnerable to leakage from unreviewed claims. Further, the managers performing manual reviews rely on their intuition to detect vulnerabilities and deficiencies within the claims, which may not be an accurate reflection of the true causes of claim leakage. The implementations of the present disclosure provide a technical solution to the technical problem by providing a significant improvement of the manual review methods in that the systems and methods of the present disclosure can perform real-time reviews of all open claims for a provider on a periodic basis throughout the life of a claim. Further, because the system detects claim vulnerabilities using a trained vulnerability detection data model that is customized to individual insurance providers, claims are processed using standardized, calibrated vulnerability detection metrics rather than with inconsistencies, subjectivity, and blind spots in human intuition.

Because performing audits of closed insurance claims is both labor and time intensive, closed claim file audits are conducted infrequently, which delays the value that can be created through the lessons learned for how to identify root causes of leakage and mishandling of claims. The present disclosure provides a technical solution to a technical problem rooted in computer technology by extracting targeted vulnerability detection features within unstructured claim data files identified by machine learning algorithms. By continuously (e.g., daily, weekly, monthly, or whenever newly closed claims are identified) updating the data sets that are used to train the vulnerability detection data models for providers, the claims monitoring system can continuously leverage learned knowledge from closed insurance claims to identify vulnerabilities within open insurance claims.

FIG. 1 is a diagram of an example environment 100 for a claims monitoring system 108. The diagram illustrates relationships, interactions, computing devices, processing modules, and storage entities used to gather, generate, organize, store, and distribute the information necessary to proactively detect potential issues with how insurance claims are handled, referred to as vulnerabilities, and provide recommendations for how to resolve the issues to prevent or reduce claim leakage. In some implementations, the vulnerability detection and resolution information can be used by claims managers 102b and handlers 102a for insurance providers (together, insurance providers 102) to effectively assess performance of claims handlers and provide training to the claims handlers through a feedback mechanism of the system 108 that increases a monitoring frequency of claims with detected vulnerabilities to determine whether root causes of vulnerabilities have been resolved.

In certain embodiments, insurance providers 102 may connect to the claims monitoring system 108 via a number of computing devices distributed across a large network that may be national or international in scope. The network of insurance providers 102 can be separate and independent from networks associated with other entities in the claims monitoring environment 100, such as the external entities 104. In addition, the data handled and stored by the insurance providers 102 may be in a different format than the data handled and stored by the other entities of the loss determination environment 100. The insurance providers 102 may include, in some examples, brokers, insurance/reinsurance carriers, or any other person interacting with the claims monitoring system 108 by performing actions related to claims handling and monitoring. For example, the providers 102 can include insurance carrier employees 102a who ensure proper claims handling from the time an insurance claim is reported until a final claim decision and corresponding payment is made and managers 102b for the insurance carriers who supervise the performance of claims handlers 102a.

In some examples, the claims handling personnel 102a, via one or more distributed computing devices, interact with the various parties to an insurance claim (e.g., for an automobile accident, law enforcement officers, medical professionals, each driver or person riding in the car that was damaged, vehicle inspectors) and provide inputs to the system 108 associated with those interactions. Any data associated with a given claim is stored in data repository 110 as claim data 112, which can include both structured and unstructured data. In some examples, the claim data 112 may include data for both open and closed claims. In some implementations, the claims handlers 102a may directly input data to the system 108 that is organized into relational databases and stored as structured data (e.g., insurance policy information, claim identification codes, dates and times of when a claimant was contacted, official medical diagnoses). The claims handlers 102a may also provide to the system 108 other documents related to a claim that are stored in data repository 110 as unstructured data in multiple formats. In some examples, the claims handlers 102a may provide the documents to the system by scanning, uploading, or downloading from a data source (e.g., receipts, police reports, medical records, automobile inspection reports for automobile insurance claims). The unstructured data may also include free text notes claims handlers input directly to the system 108 (e.g., notes regarding any calls or interactions with a claimant, medical professional, law enforcement professional, or vehicle inspector). In one example, the claim data 112 for a respective claim portfolio includes a combination of document files and data table entries associated with the respective claim. Additionally, the system 108 may store claim data 112 for each insurance provider 102 in the data repository 110.

The insurance providers 102, in some embodiments, may also include claims handling managers 102b for insurance carriers who supervise the performance of groups of claim handlers 102a within the insurance carrier organization. In some implementations, the claims monitoring system 108 can provide the claims handling managers 102b with information regarding the performance of the claims handlers 102a under his or her review and any detected vulnerabilities within any claims under the manger's purview. The system 108, in some examples, provides the claim handling information to the managers 102b within a dashboard interface screen that a manager can access by providing log in credentials at the interface screen.

Figure 5B:
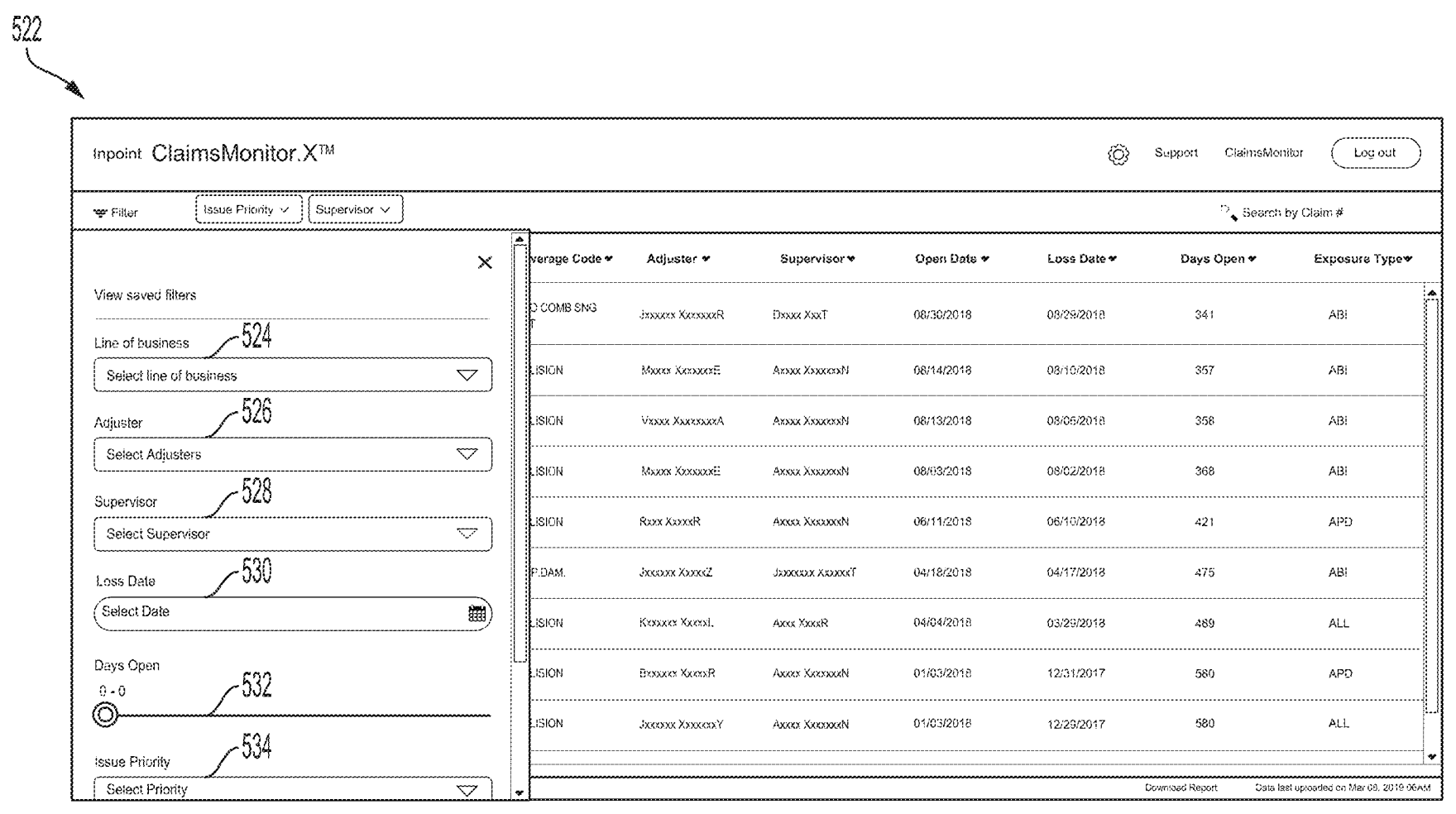

Upon receiving manager login credentials, the system 108 provides a dashboard interface screen to the associated computing device with a summary view of each of the claims assigned to a claims handler 102a under the supervision of the manager 102b (See FIGS. 5A-5C). In some examples, the summary view within the dashboard interface screen displays a priority for review (display field 504 in FIG. 5A) that corresponds to a likelihood that one or more of the vulnerabilities detected within a respective claim will result in leakage. For example, claims with a high review priority detected vulnerabilities that have a higher likelihood of resulting in leakage or a higher cost associated with the leakage than claims with a review priority of "low" or "on track." The claims monitoring system 108 also provides the managers 102b an opportunity to view and drill down on details of the claim vulnerabilities, which may include each type of vulnerability detected by the system 108, issues associated with the vulnerabilities could result in claim leakage, a likelihood of occurrence of the issue based on the detected vulnerability, and one or more potential root causes of the issue (see FIG. 10). In some examples, the managers 102b can interact with the user interface screens presented by the system 108 to provide information regarding issue resolution of the detected vulnerabilities or to flag one or more detected vulnerabilities for follow up at a later date.

External entities 104, in some implementations, include a number of computing devices distributed across a large network that may be national or international in scope. The network of external entities can be separate and independent from networks associated with other entities in the loss determination environment 100, such as the insurance providers 102. In addition, the data handled and stored by the external entities 104 may be in a different format than the data handled and stored by the other participants of in the claims monitoring environment 100. The external entities 104 can include any type of external system that interfaces with the claims monitoring system 108 to provide data related to processing claims such as medical facility computing systems, law enforcement computing systems, and inspector computing systems. In some examples, the external entities 104 can directly upload claim documentation to the system 108 without intervention of a claims handler 102a. For example, medical personnel can upload or transmit medical records of patients involved in an open claim 108 to the claims monitoring system 108 and associated with the appropriate claim within claim data 112.

In some examples, the external entities 104 may also include computing systems of other claims monitoring systems, governments, or organizations that provide historical data related to insurance claims and any leakage that resulted from how the claims were handled. In some implementations, the system claims monitoring 108 stores the data received from the external entities 104 along with data gathered from the insurance providers 102 interacting with the system 108 as historical data 116 in data repository 110. In some embodiments, the claims monitoring system 108 trains a machine learning data model used to detect vulnerabilities within claims with a combination of the historical data 116 and provider-specific production data, which is referred to as merged data 118.

In some embodiments, the claims monitoring system 108 may include one or more engines or processing modules 130, 132, 134, 136, 138, 140, 142, 146 that perform processes associated with monitoring open insurance claims for vulnerabilities that can lead to claim leakage and potentially preventable costs for insurance providers 102. In some examples, the processes performed by the engines of the claims monitoring system 108 can be executed in real-time to provide an immediate response to a system input such as a request by a claims handling manager 102b to view a status of all open claims being handled by a claims handler 102a under the supervision of the manager 102b. In addition, the processes can also be performed automatically in response to a process trigger that can include a specific day or time-of-day or the reception of data from a data provider (e.g., one of the external entities 104 such as a medical provider or law enforcement officer), one of the claims handlers 102a, one of the managers 102b, or another processing engine.

In some implementations, the claims monitoring system 108 may include a user management engine 130 that may include one or more processes associated with providing an interface to interact with one or more users (e.g., individuals employed by or otherwise associated with insurance providers 102 such as the claims handlers 102a and managers 102b) within the claims monitoring environment 100. For example, the user management engine 130 can control connection and access to the claims monitoring system 108 by the insurance providers 102 via authentication interfaces at one or more external devices 158 of the insurance providers 102. In some examples, the external devices 158 may include, but are not limited to, personal computers, laptop/notebook computers, tablet computers, and smartphones. In some implementations, the user management engine 130 controls which system data is displayed to which system user. For example, the user management engine 130 associates each claims handler 102a and manager 102b with a set of open and/or closed insurance claims and only information associated with the set of claims and/or other authorized information is displayed for viewing and editing by a particular user based on received authentication credentials.

The claims monitoring system 108, in some implementations, includes a claim processing engine 146 that extracts key vulnerability detection features from stored claim data 112 for each insurance claim, both open and closed, monitored by the system 108. When processing unstructured data from an insurance claim, (e.g., notes regarding any calls or interactions with a claimant, medical professional, law enforcement professional, or vehicle inspector, receipts, police reports, medical records, automobile inspection reports for automobile insurance claims), the claim processing engine 146 may apply a natural text detection algorithm to the unstructured data file to extract textual features of the file. In some examples, the claim processing engine 146 uses learned machine knowledge to determine which of the features of both the structured and unstructured data in the claim are applicable to claim vulnerability detection. For example, the learned machine knowledge may include specific phrases used by claims handlers, medical professionals, law enforcement officers, vehicle inspectors, and others providing claims documentation in the context of an automobile insurance claim that can be used to identify features of the claims related to potential vulnerabilities based on how they are used relative to the key features.

In some implementations, the claim processing engine 146 extracts key vulnerability detection features from closed insurance claims, referred to as client production data 129. The vulnerability detection features, in one example, may be specific to individual insurance providers 102 based upon a respective provider's business rules and claims handling processes. In addition to one or more default features, the analytics training engine 134, using machine learning algorithms, can learn additional provider-specific vulnerability detection features over time based on shared characteristics between claims for a particular provider 102. In other examples, providers 102 may directly provide their business rules and claim handling characteristics to the claims handling system 108. In some examples, analytics training engine 134 uses the client production data 129, in combination with historical data 116, to train a machine learning data model to detect vulnerabilities within open claims that are likely to cause claim leakage.

The claim processing engine 146, in some embodiments, also extracts key vulnerability detection features from open insurance claims, which are used by vulnerability detection engine 138 to identify leakage vulnerabilities within the open claims. In one example, the claim processing engine 146 organizes the key vulnerability features extracted from each open insurance claim into feature vectors, which are stored in data repository 110 as claim feature vectors 114. Vulnerability detection engine 138, in some embodiments, identifies vulnerabilities for a set of open claims by applying a data model trained to the extracted features of the open claim feature vectors 114. In some implementations, the vulnerability detection features can include any information associated with one or more vulnerability metrics (see FIG. 4). For example, vulnerability detection features can include dates of contact with each of the parties associated with an insurance claim, dates of missed calls from each of the parties, excerpts (e.g., key words, phrases, sentences) from summaries of conversations with each of the parties, coverage information for an insurance policy, information regarding referrals to management or counsel, investigative action plan information, summaries of statements of each of the parties, loss information, and liability analysis information.

The claims monitoring system 108, in some examples, may also include a data management engine 132 that organizes, stores, and controls access to data in data repository 110. For example, in response to receiving an upload of a document associated with an insurance claim, the data management engine 132 links the document with a particular claim based on common identification characteristics (e.g., claim number, claim reporting date, incident date, names and/or birth dates of affected parties) and stores the linked document as claim data 112. Further, upon receiving any updates from claims handlers 102a or managers 102b regarding the resolution of a detected vulnerability, the data management engine 132 updates the claim data 112.

In some implementations, the data management engine 132 also generates merged data sets from historical data 116 and client production data 129. In some examples, the data management engine 132 normalizes the client production data 129 generated by the claim processing engine 146 for the respective provider 102 to be compatible with the historical data 116 and merges the normalized client production data 129 and historical data 116 into a single merged data set 118 that is customized to respective provider 102.

For example, FIG. 3 illustrates a table 300 of claim features 302 for historical data 116, client production data 129, merged data 118, and/or the claim feature vectors 114 for open insurance claims. The claim features 302 included within the table 300 are not meant to be an exhaustive list but are merely exemplary of features that can be used by the system 108 to detect vulnerabilities associated with claim leakage. In some implementations, the claim features 302 can include claim identification information, date the claim was open, assigned claim handler, type of claim, loss description, loss amounts associated with indemnity, medical, reserve, and salvage, whether legal proceedings have been pursued, and supervisor identification code. In addition, the claim features 302 can also include an indicator for whether an external adjustor is involved in a claim evaluation process, a litigation status indicator, whether the claim involves salvage items and a total amount for the salvage items, and whether the claim is qualified for subrogation. Each claim feature 302 has a corresponding normalization method 304 used by the data management engine 132 to normalize a claim feature of client production data 129 to be compatible with stored historical data 116. For example, the normalization methods 304 may include mapping features to specific values (e.g., Yes/No), converting features to a float value, removing abbreviations, or converting to another predetermined format. In some examples, the claim features 302 can correspond to either extracted features 226 and/or target variables 228 used by analytics training engine 134 to train the vulnerability detection data models as shown in FIG. 2B.

Returning to FIG. 1, the claims monitoring system 108, in some implementations, also includes an analytics training engine 134 that trains vulnerability detection data models for each provider 102 that interacts with the system 108 using supervised and/or unsupervised machine learning algorithms. Because each merged data set 118 is customized to an individual provider 102, the analytics training engine 134 can generate a trained data model that is also customized to the individual provider 102. In some examples, the analytics training engine 134 trains a vulnerability detection data model for a provider 102 with data from the corresponding merged data set 118 for that provider 102 and a targeted set of weighted training variables 124 related to proactively identifying vulnerabilities within claims that lead to claim leakage. In some examples, the training variables and weights 124 are default values that are manually provided to the system 108 and stored in data repository 110. In one example, the analytics training engine 134 may automatically update the training weights and variables 124 as the machine learning knowledge base grows (e.g., as feedback, highlighting, and comments are received from users at UI screens 600 and 700 shown in FIGS. 6-7). In some implementations, the training variables 124 correspond to the claim features of the merged data sets 118 and claim features vectors 114.

In some embodiments, the analytics training engine 134 initiates training of customized vulnerability detection data models for providers 102 on a periodic basis to incorporate additional data for claims that have been closed since a vulnerability detection data model was previously trained to ensure that that trained data models 122 can leverage knowledge from all of the closed claims. For example, if the analytics training engine 134, by comparing a date associated with a trained vulnerability model for a provider 102 to claim closing dates for the provider 102 stored as claim data 112 in data repository 110, determines that the trained model does not incorporate the most recent closed claims data, then a process for training the respective vulnerability detection data model is initiated (see method 1300 in FIG. 13A).

Figure 2A:
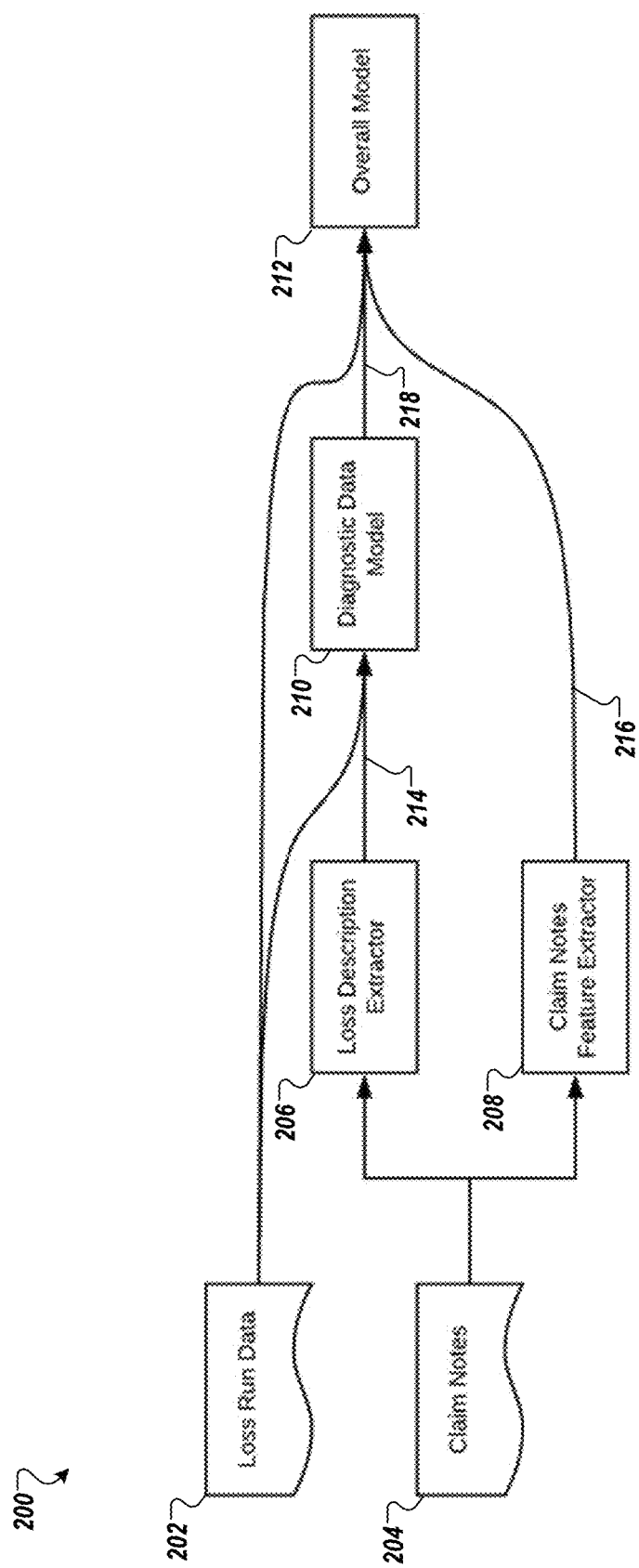
FIG. 2A is a block diagram of a work flow for generating a data analytics model for monitoring claim quality.
Figure 2B:
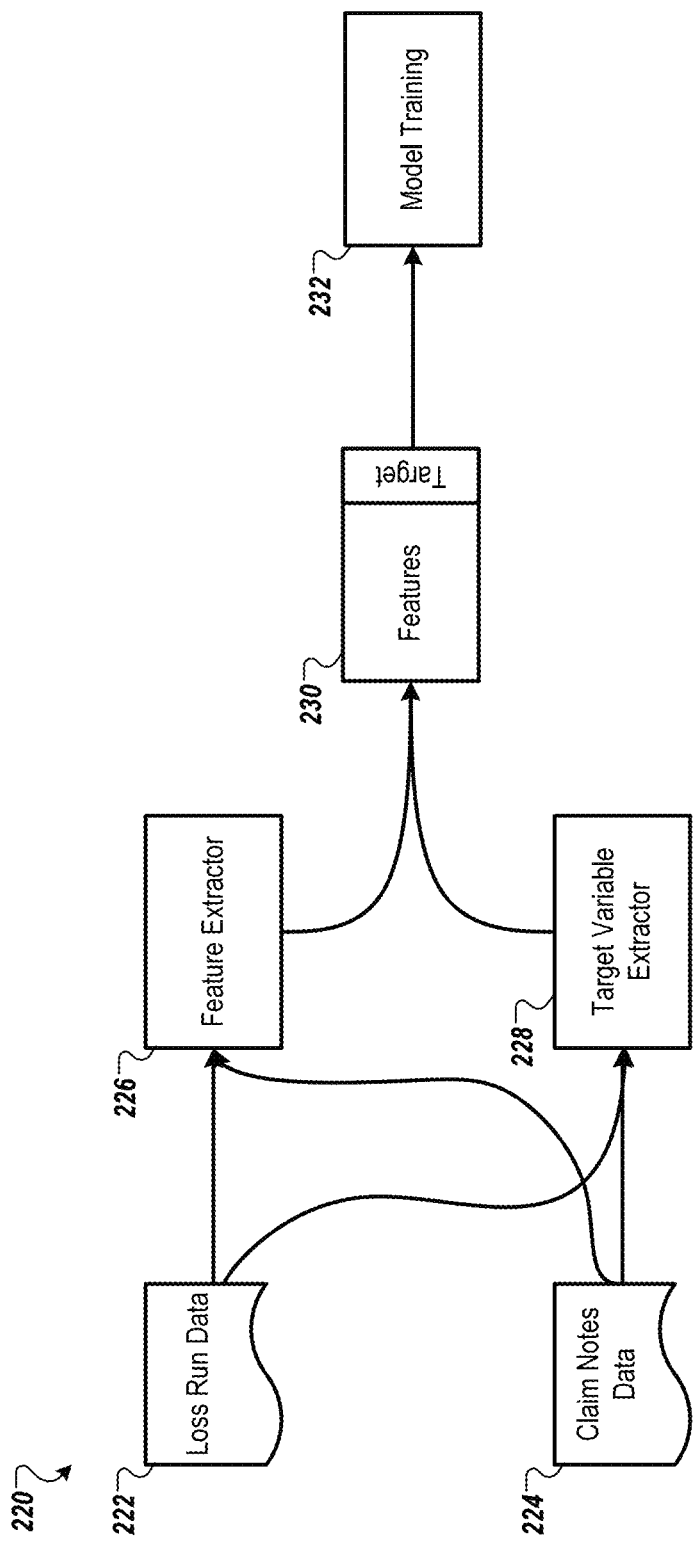
FIG. 2B is a block diagram of a work flow for identifying target variables from loss data and claim loss data associated with sets of features for training vulnerability detection data models.

FIG. 2A illustrates a work flow 200 of how the claims monitoring system 108 trains the vulnerability detection data models for each provider 102. In some implementations, the claim processing engine 146 extracts features from closed insurance claims 204 for a provider 102 that are combined with historical loss run data 202, which are used by the analytics training engine 134 to train an overall vulnerability detection data model 212 for each provider 102. In some embodiments, the claim processing engine 146 includes a loss description feature extractor 206 that extracts features 214 from the closed claim data related to quantifiable loss characteristics of a claim. For example, the loss characteristics may include loss amounts for indemnity, medical, reserve, and total losses, loss types, and a salvage total. The loss description feature extractor 206, in some embodiments, can derive a description of the loss from all of the claim notes in the event that a loss description is not provided in the claim documentation. In some implementations, the loss description feature extractor 206 that extracts key words from claim documentation to generate a loss description for the claim.

In some examples, the data management engine 132 merges the features 214 associated with quantifiable loss characteristics identified by the loss description feature extractor 206 with the historical loss run data 202 to form a first merged data set, which is used by the analytics training engine 134 to train a diagnostic data model 210. In some implementations, the diagnostic data model 210 can be trained to output a probability of an occurrence of a claim handling violation or other vulnerability in each phase of insurance claim processing. For example, the output of the diagnostic data model 210 represents in a probabilistic manner the phases of the claim handling process that are likely to have violations or other vulnerabilities.

In some examples, the claim processing engine 146 also includes a claim notes feature extractor 208 that uses natural text detection and other unstructured data processing techniques to extract one or more relevant features 216 from the claim notes (e.g., notes regarding any calls or interactions with a claimant, medical professional, law enforcement professional, or vehicle inspector) and other unstructured data associated with a claim (e.g., receipts, police reports, medical records, automobile inspection reports for automobile insurance claims). In some implementations, the claim notes feature extractor 208 extracts features by applying specific sets of rules to the claim notes. For example, the claim notes feature extractor 208 may apply a contact detection rule to detect instances of when a claims handler made contact with one of the parties to a claim. The claim notes feature extractor 208, in some examples, may apply a natural text detection algorithm to the unstructured data file to extract textual features of the file.

In some examples, the claim processing engine 146 uses learned machine knowledge to determine which of the features of both the structured and unstructured data in the claim are applicable to claim vulnerability detection. For example, the learned machine knowledge may include specific phrases used by claims handlers, medical professionals, law enforcement officers, vehicle inspectors, and others providing claims documentation in the context of an automobile insurance claim that can be used to identify features of the claims related to potential vulnerabilities based on how they are used relative to the key features. In one example, the features 216 extracted by the claim notes feature extractor 208 can include dates and times of initial and subsequent contacts with drivers, passengers, or witnesses, key phrases used by a claims handler in communication with the parties of an insurance claim, investigation and context in which those phrases were used (e.g., in a phone call or email), coverage analysis information, and lost income documentation information.

The features 216 extracted by the claim notes feature extractor 208, in some implementations, are merged with the output 218 of the diagnostic data model 210 and historical loss run data 202 and are used to train the overall vulnerability detection data model 212. In some implementations, because the extracted claim notes features 216 are merged with the output of the diagnostic data model 210 improves the output of the overall vulnerability detection data model 212 by removing bias from the data received from an individual provider 102 and also enlarges the data set used to train the overall vulnerability detection data model 212.

FIG. 2B illustrates an example of a workflow 220 for identifying target variables from loss data and claim loss data associated with sets of features for training the vulnerability detection data models for each provider 102. In some examples, supervised learning algorithms like the vulnerability detection data model can use a set of features/predictors that are linked to target variables for training the data model. In some examples, the target variables may correspond to vulnerability metrics identified by the trained vulnerability detection data models. In some implementations, difficulties can arise when the data sets the learning algorithms used to train the vulnerability detection data model do not have properly enumerated and labeled information regarding the target training variables. In some examples, this type of difficulty can arise when claim notes data 224 and historical loss run data 222 is extracted from both opened and closed claims data because the extracted data is unstructured and unlabeled. In some implementations, the claims monitoring system 108 can be configured to use pattern recognition techniques to identify patterns in the extracted data to detect target variables for accurately training the vulnerability detection data model. Additionally, target variables may represent a type of vulnerability that can be detected or a conclusion that can be drawn from a group of extracted claim features.

For example, the vulnerability detection data model of the claims monitoring system 108 can be used to detect whether a recorded statement (R/S) is necessary for a particular claimant. If a recorded statement is necessary based on aspects of the detected features and not present in the extracted claims data 224, then a vulnerability associated with claims leakage may be detected. In this example, whether a recorded statement should be taken can be considered a target variable to be identified by the model. Therefore, the analytics training engine 134 may scan through extracted historical claim data for evidence of whether a recorded statement was taken along with other features associated with determining the necessity of obtaining a recorded statement. In this example, the learning algorithm that trains the vulnerability detection data model can apply data features from historical loss run data, liability analyses, and claimant information (e.g., age, gender, and other demographic information) along with target variable information (e.g., whether or not a recorded statement was taken) to train the vulnerability model. However, because adjusters use natural language in their claim notes to document whether a recorded statement was taken, the recorded statement target variable information may not be properly identified for use by the supervised learning algorithm.

To solve this difficulty, in some implementations, the analytics training engine 134 and/or claim processing engine 146 can apply a text scraping or other type of information extraction before the machine learning step to specifically identify and extract target variables 228 and associated feature data 226 within the claims notes data 224 and/or historical loss run data 222. In some examples, when detecting and extracting the target variables (228), the analytics training engine 134 can be configured to detect whether certain patterns of words appear in the notes and use this pattern to create the target variables used to train the vulnerability detection data model. For example, in a set of claims notes, if the analytics training engine 134 identifies the phrase "R/S with John Doe," the engine 134 can apply a "yes" to the target variable for the recorded statement training variable. In some embodiments, once the analytics training engine 134 has detected whether training variables are present within both structured and unstructured data in the claims notes data and loss run data, the detected features and training variables are linked 230. In some examples, the linked target variables and feature data can be used for training of the vulnerability detection data model 232. This process of identifying target variables within unstructured claims notes data and loss run data 228 and linking the extracted target variables to associated features 230 that may not always provide explicit variable identification provides a technical solution to the technical problem of detecting and generating structured target variables from unstructured, natural language claims notes data and historical loss run data that can be used to train a customized vulnerability detection data model for each provider 102. Further, because each set of linked target variables and features are specific to a particular provider, the trained vulnerability detection data model is further customized to detecting claim vulnerabilities for each provider 102 even though providers 102 may use different notating conventions when inputting claims notes to the system 108. In some examples, the linked target variables and associated features correspond to entries in claim feature vectors that are used to train the vulnerability detection data models for each provider 102.

Returning to FIG. 1, in some implementations, the claims monitoring system 108 also includes a vulnerability detection engine 138 to identify, in real-time, issues with how claims are being handled that will likely result in claim leakage. Because the analytics training engine 134 generates trained data models that are customized to each provider, the vulnerability detection engine 138 can, in real-time, detect vulnerabilities related to claim leakage that are particular to an individual provider 102. For example, each provider 102 may have claims handling metrics associated with company policies and procedures that are particular to an individual provider 102, and the vulnerability detection engine 138 can identify vulnerabilities that reflect the specific claims handling metrics of the providers 102.

In some examples, the vulnerability detection engine 138 identifies vulnerabilities for a set of open claims by applying a trained vulnerability detection data model for a provider 102 to extracted features of the provider's open claims. In some embodiments, based on the patterns of claims handling deficiencies identified by the vulnerability detection data model, the vulnerability detection engine 138 outputs one or more vulnerabilities detected within the claims that correspond to one or more types of vulnerability metrics 121 associated with claim leakage. In some examples, the claims monitoring system 108 stores a set of vulnerability metrics 121 in data repository 110, which the trained vulnerability detection data models use to detect vulnerabilities within the claims.

For example, FIG. 4 is a table 400 showing vulnerability metric categories 402 and corresponding overall likelihoods of leakage 404 for each category 402 indicating a relative importance of each vulnerability metric category 402 with respect to predicting claim leakage. In some implementations, each vulnerability metric category 402 has one or more corresponding vulnerability metrics 121 that the vulnerability detection engine 138, by applying the vulnerability detection data model, uses to identify any claim vulnerabilities. In some embodiments, each of the vulnerability metrics 121 within a category 402 has its own individual likelihood of leakage indicating the respective metric's relative impact on whether or not leakage occurs for a given claim. For example, the "contact" metric category can have associated vulnerability metrics such as whether initial contacts with all pertinent parties were timely and proper and whether subsequent contact was made with all applicable parties. Further, the "investigation" metric category can have associated vulnerability metrics of whether all elements of investigative action planning were handled properly, whether all necessary statements were taken, whether the loss facts investigation was properly completed, whether the non-auto property damage investigation was completed properly, whether the special investigation unit (SIU) was notified properly, and whether a proper third-party investigation was completed.

Returning to FIG. 1, by running the feature vector for a particular open claim through a machine learning algorithm with a customized vulnerability detection data model, the vulnerability detection engine 138 identifies leakage vulnerabilities within the open claim based on whether or not the open claim meets each of the metrics. In some embodiments, the vulnerability detection engine 138 also computes a likelihood 404 that each detected vulnerability will result in leakage (e.g., highly likely, likely, or maybe likely) that corresponds to a confidence level for a vulnerability prediction made by the trained model. In some examples, the detected vulnerabilities and associated likelihood of leakage for each claim are stored as vulnerability data 120 in data repository 110. In some examples, each open claim maintained by the claims monitoring system 108 is processed by the vulnerability detection engine 138 for vulnerabilities at periodic intervals and/or at predetermined points in the lifecycle of the claim. In some implementations, the vulnerability detection engine 138 processes claims at the request of a manager 102b and/or as a feedback check as determined by feedback loop engine 140.

The claims monitoring system 108, in some implementations, can also include a claim scoring engine 142 that computes a score for each open claim based on the detected vulnerabilities, which is stored as claim scoring data 128 in data repository 110. In some implementations, the score computed for each claim can be a function of a number of vulnerabilities detected within each claim and a corresponding likelihood of leakage (e.g., severity level) associated with the detected vulnerability. In one example, the score may be an average of the likelihoods of leakage for the detected vulnerabilities (e.g., critical, high, medium, and low likelihoods of claim leakage associated with the vulnerability). In other examples, the claim scoring engine 142 may increase an overall likelihood of leakage for the claim based on a total number of detected vulnerabilities. For example, if five vulnerabilities with a "medium" likelihood of leakage are detected, the claim scoring engine 142 may assign a score of "high" to the claim because a threshold number of detected vulnerabilities has been exceeded. In other examples, the score for a claim corresponds to a highest likelihood of leakage for any of the vulnerabilities detected within the claim. For example, if one vulnerability is detected within a claim with a likelihood of leakage of "high" (e.g., improper utilization of experts/expert reports) and one vulnerability is detected with a likelihood of leakage of "low" (e.g., claim should not have been escalated or transferred), then the claim scoring engine 142 assigns an overall score of "high" to the claim. In other examples, the claim scoring engine 142 calculates the claim score as a percentage or value on a scale (e.g., 0 to 10) in which lower scores indicate a lower probability of claim leakage based upon the number and severity of detected vulnerabilities and higher scores indicate a higher probability of claim leakage.

The claim scoring engine 142, in some embodiments, may generate rankings for open claims of a provider 102 based on the computed scores for each of the claims. In some implementations, the claim scoring engine 142 may score the claims relative to all the open claims for the provider 102 or a subset of claims. For example, each open claim may be ranked relative to other claims being handled by the same claims handler 102a or relative to other claims associated with a particular manager 102b. In another example, a set of claims being handled by one claims handler may be ranked relative to another set of claims being handled by another claims handler. The claims rankings, in some examples, may also be stored as claim scoring data 128 in data repository 110.

In some implementations, the claims monitoring system 108 also includes a feedback loop engine 140 that provides an automatic oversight mechanism for tracking resolutions to identified claim vulnerabilities and generating performance information for claims handlers 102a that can be used by managers 102b to make personnel decisions (e.g., promotions, terminations) or provide additional training. For example, the feedback loop engine 140 may increase a frequency of vulnerability detection processing of open claims that have been identified as having a high risk for leakage due to previously detected vulnerabilities. In one example, claims that as having a high risk for leakage are processed and evaluated for vulnerabilities more frequently than claims that have a medium or low risk of leakage.

In some implementations, the feedback loop engine 140 can adjust the frequency with which claims are processed and/or adjust a vulnerability score of an open claim based on feedback received from a claims handler 102a and/or manager 102b at one or more user interface (UI) screens. For example, for each detected vulnerability, the assigned manager 102b can provide feedback regarding whether no action is needed for the detected vulnerability, that action has been already taken to resolve the issue for the detected vulnerability, or to remind the manager 102b again in a predetermined number of days (see data field 608 for UI Screen 600 in FIG. 6). In some examples, the feedback provided by managers 102b and/or claims handlers 102a at the UI screens can be stored in the data repository 110 as feedback data 126.

In some examples, the feedback loop engine 140 can rank and/or score the performance of each claims handler 102a for particular provider based on a number or percentage of vulnerabilities and corresponding likelihoods of leakage that are detected within a claim or set of claims assigned to a respective claims handler 102a. In some examples, the feedback loop engine 140 may rank each claims handler 102a relative to other claims handlers 102a associated with a provider or assigned to a particular manager 102b. In other examples, the feedback loop engine 140 may rank claims handlers 102a relative to other claims handlers 102a with a similar amount of experience or seniority within the organization. In some examples, for claims handlers 102a having performance rankings below a predetermined threshold (e.g., within a bottom percentage of performance of all claims handlers 102a for the provider, claims handlers 102a who perform worse than other claims handlers 102a with similar experience, or claims handlers 102a who consistently have low scoring claims), the feedback loop engine 140 may automatically increase the frequency that the claims handled by the low performing claims handler 102a are processed and evaluated for vulnerabilities by the claims monitoring system 108. Information related to the rankings and/or scores for claims handlers 102a can be stored as handler performance data 127 in data repository 110.

In some implementations, the claims monitoring system 108 may also include a front-end driver engine 136 that controls dissemination of data and interactions with insurance providers 102 through one or more UI screens and/or messaging formats (e.g., email, text message, or notification at an application interface). In some embodiments, user access to the system 108 is provided through a website or web-hosted application. In some examples, the front-end driver engine 136 can output information to the external devices 158 in response to queries received from claims handlers 102a and/or managers 102b to view vulnerabilities for one or more open claims, initiate vulnerability detection for a claim, and view performance scores or rankings for an assigned set of claims handlers 102a. For example, as shown in FIG. 5A, upon providing login credentials, a manager 102b can view a set of claims assigned to the claims handlers under supervision of the manager 102b at a summary UI screen 500 and can view further details regarding vulnerabilities associated with a claim at detail UI screen 536 (FIG. 5C).

Additionally, in response to receiving inputs at UI screens, the front-end driver engine 136 may output, in real-time, any information associated with the provided input. For example, in response to receiving a selection to view potential root causes for a detected vulnerability, the front-end driver engine 136 may present, in real-time, a root cause UI screen (e.g., root cause UI screen 1000 in FIG. 10) that provides probabilities of occurrence for each of the potential root causes for the detected vulnerability.

FIGS. 5-12 illustrate UI screens for providing detected claim vulnerability information to an insurance provider 102, which can include managers 102b and/or claims handlers 102a. As shown in FIG. 5A, upon verification of the login credentials by user management engine 130, the front-end driver engine 136 presents a summary view UI screen 500 that provides a list of open claims assigned to the user, which in one example may be a manager 102b. In some implementations, the summary view UI screen 500 may provide one or more sortable and/or filterable claim detail fields, such as claim number 502, issue priority 504, line of business 506 (e.g., auto, home), coverage code 508 (e.g., collision, property damage), adjuster/claim handler name 510, supervisor name 512, date claim was opened 514, loss date 516, number of days the claim has been open 518, and risk exposure type 520. The issue priority 504, in some embodiments, corresponds to a highest likelihood of leakage of any vulnerability detected within the claim (e.g., low, medium, or high). In some examples, if no vulnerabilities are detected, then the issue priority field 504 may indicate that the claim is "on track." In some implementations, the front-end driver engine 136 can sort and/or filter the claims according to one or more of the characteristics 502-520 in response to a user input.

FIG. 5B shows a claim filtering UI screen 522 that allows system users to filter the claims presented in the summary UI screen 500 according to one or more criteria at filter input fields 524-534. In some implementations, the filter criteria input fields can include line of business 524, adjuster name 526, supervisor name 528, loss date 530, range of days open 532, and issue priority/likelihood of leakage 534. Other filtering criteria can also include reserve, expense, and loss amounts as well as type of exposure.

The UI screen in FIG. 5C shows a claim detail UI screen 536 presented by the front-end driver engine 136 upon selection of one of the claims presented within summary view UI screen 500 (FIG. 5A). In some examples, the claim detail UI screen 536 provides detailed information related to the detected vulnerabilities or issues that could result in claim leakage. For example, the UI screen 536 can include a claim summary section 538 that includes at least a portion of the information displayed for the claim in the summary view UI screen 500 shown in FIG. 5A. In some examples, the claim summary section 538 can include the claim number, line of business, coverage code, open date, loss date, number of days open, exposure type, feature number, insured name, loss description, adjuster name, reserve amount, expense amount, paid loss, and issue priority. In some examples, the claim detail UI screen 536 can also include an alert section 540 that displays summary information for one or more detected vulnerabilities associated with the claim. In some examples, the summary information for the detected vulnerability can include claim phase associated with the vulnerability 542 (e.g., contact phase), leading practice question associated with the vulnerability 544 (e.g., "Were initial contacts with all pertinent parties achieved?"), issue likelihood 546 (e.g., highly likely), potential issues 548 (e.g., contact attempt not made with the insured), and supervisor 550.

Figure 6:
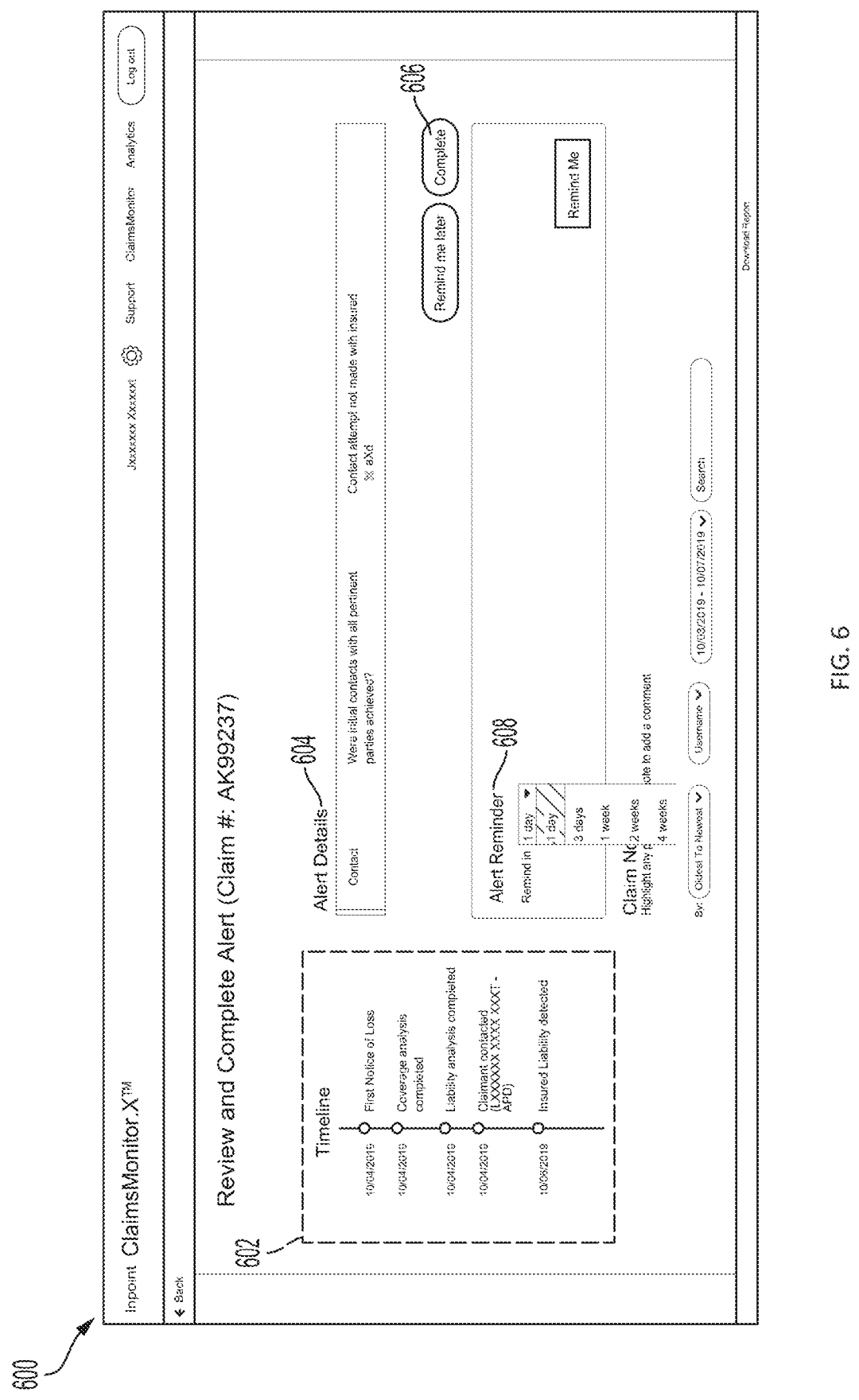

Upon selecting a "review and complete" selector 552, the front-end driver engine 136 can present an alert review and complete UI screen 600 as shown in FIG. 6. In some examples, the review and complete UI screen 600 can display a timeline portion 602 that includes dates for different types of events associated with a claim (e.g., first notice of loss, coverage analysis completed, liability analysis completed, claimant contacted, insured liability detected). The UI screen 600, in some implementations, can also include an alert detail section 604 that displays a portion of the alert information displayed in the alert section 540 at UI screen 536 (FIG. 5C). If the user viewing the alert either completes or confirms completion of a task associated with the alert (e.g., attempting to make contact with the insured), then the user can indicate completion at completion selector 606. Otherwise, the user can set an alert reminder 608 for the system 108 to output a reminder that the task associated with the alert needs to be completed. In some implementations the alert reminder 608 can be set for a number of hours, days, weeks, or other time period. In some examples, the alert information for detected vulnerabilities will remain in the alerts section 540 of the UI screen 536 (FIG. 5C) unless the manager 102b selected "remind in [X] days" and that number of days has not yet passed or the likelihood of leakage for the detected vulnerability has been reduced (e.g., "likely" to "maybe likely" or "highly likely" to "likely").

Figure 7:
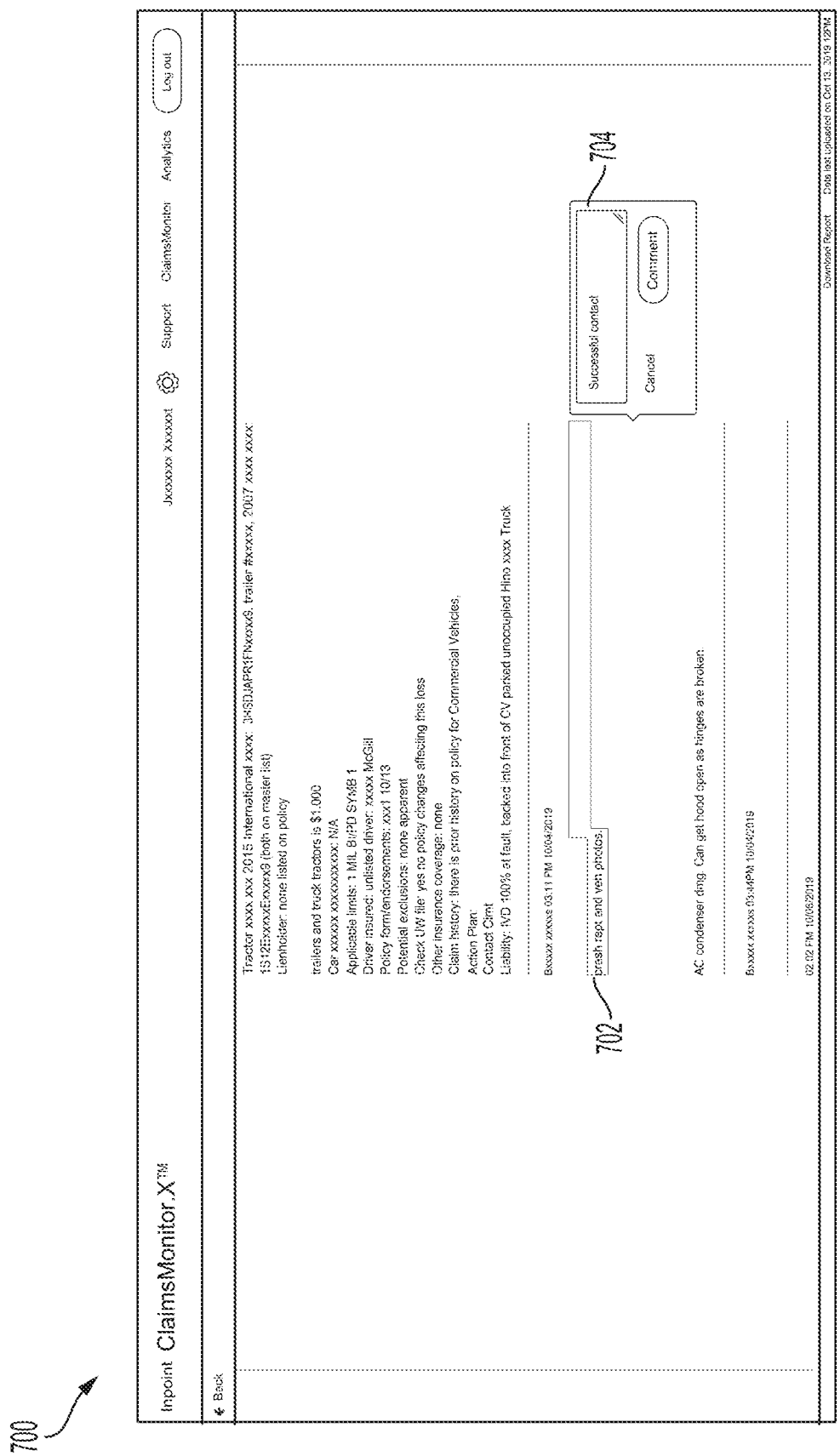

In some embodiments, upon selecting a "comment" selector 554 at the UI screen 536 (FIG. 5C), the front-end driver engine 136 can present a review and comment UI screen 700 as shown in FIG. 7. In some implementations, the review and comment UI screen 700 presents all of the claim notes input by the claims handler 102a and/or manager 102b assigned to the insurance claim. In some implementations, if the claim notes reviewer identifies the resolution for the respective alert already in the claim notes, the reviewer can highlight and add an associated comment. For example, for the alert shown in the UI screen 536 (FIG. 5C) about initial contact not being made, if the reviewer identifies where initial contact was notated, the reviewer can highlight the applicable section of claim note text 702 and add a comment 704 annotating what the highlight represents. In some examples, any feedback provided by claim alert reviewers at the UI screen 700 can be add to the data used to train the vulnerability detection data model so that the accuracy of the model in automatically detecting claim handling events can be improved.

Figure 10:
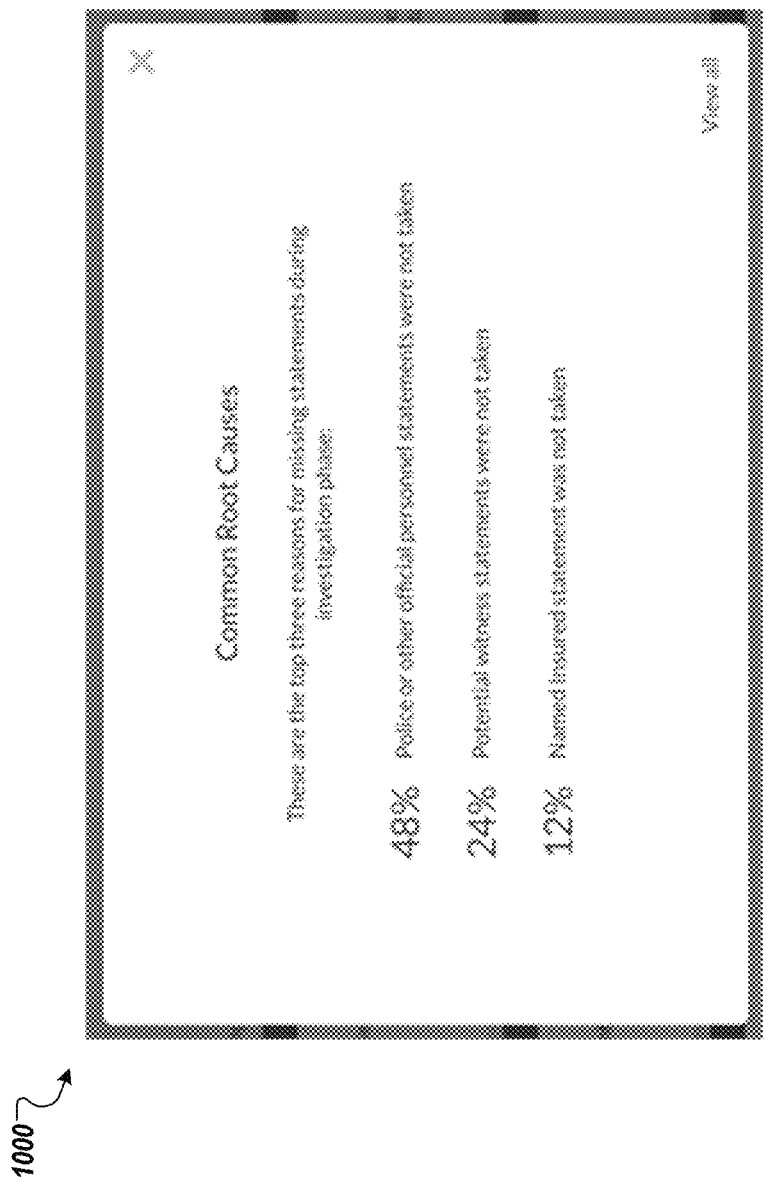

In other examples, the UI screen 536 (FIG. 5C) also includes previous issues section that provides a log of all previously detected vulnerabilities and any feedback, resolutions, or amplifying information associated with each detected vulnerability. In some implementations, once a manager 102b has provided feedback on and/or resolved a detected vulnerability, the front-end driver engine 136 moves the vulnerability and its associated feedback to the previous issues section. In some embodiments, the front-end driver engine 136 can also present a root cause UI screen 1000 as shown in FIG. 10 that presents a list of the possible root causes of the detected vulnerability along with corresponding probabilities of occurrence for each of the potential root causes. For example, for a detected vulnerability of having missing statements during an investigation phase, there is a 48% chance that the vulnerability is due to police officer or other official personnel statements not being taken, a 24% chance that the vulnerability is due to potential witness statements not being taken, and a 12% chance that named insured statements were not taken.

Figure 11:
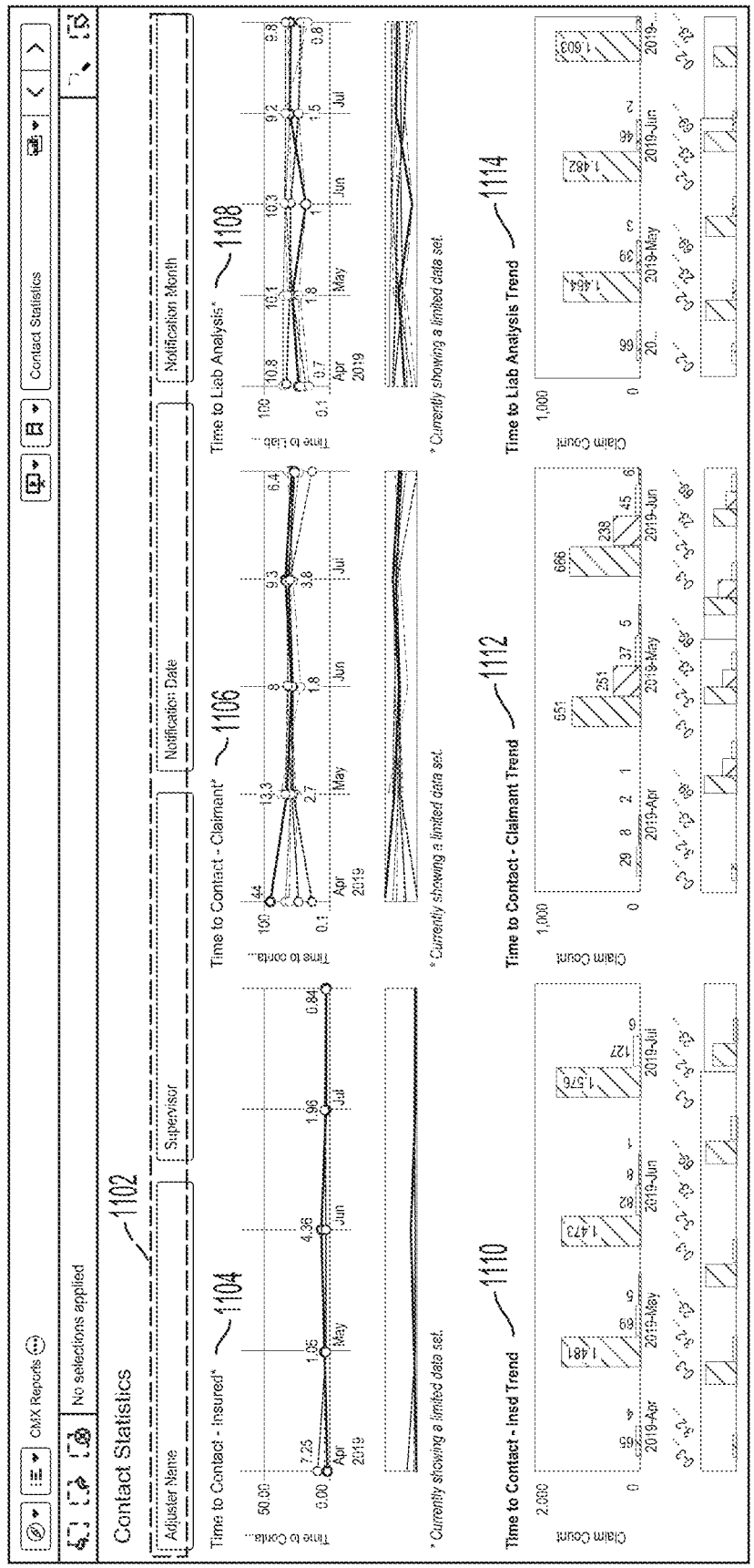
Figure 12:
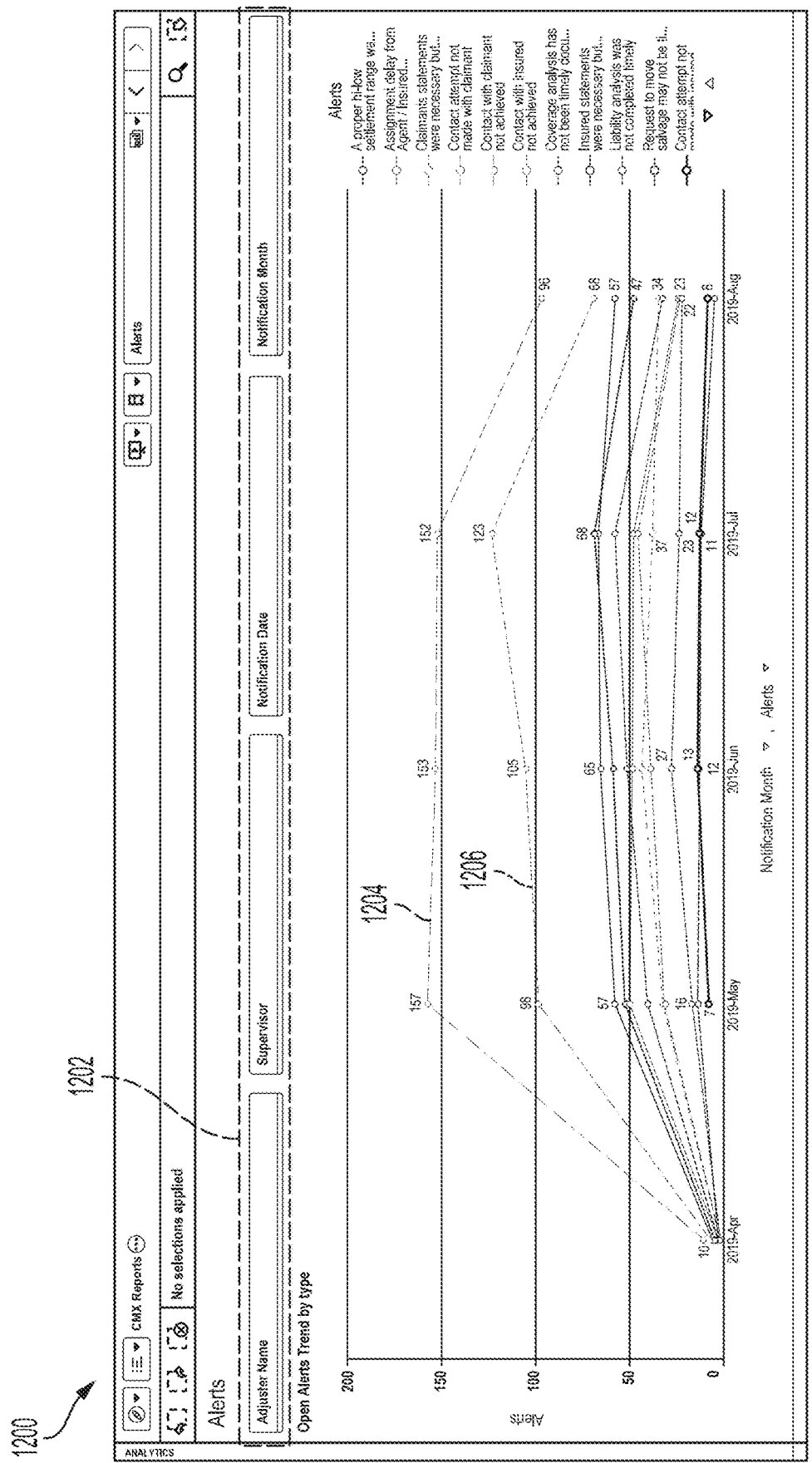

FIGS. 11-12 show examples of statistic summary UI screens 1100, 1200 that allow users to view claims handling statistics for providers 102, which allows them to see trends in how claims handlers 102a are progressing in various aspects of the claims handling process over time. For example, at the UI screen 1100 in FIG. 11, a user, such as a manager 102b, can view claims handling statistics 1104-1114 based on a set of filtering criteria 1102 that can include adjuster name, supervisor name, notification date, and notification month. In some examples, the claims handling statistics 1104-1114 can include trendlines spanning a period of months or years that show amounts of time to contact the insured 1104 and claimant 1106 as well as time to liability analysis 1108 for each claim associated with the specified criteria 1102. The UI screen 1100, in some embodiments, can also display bar graphs showing numbers of claims that met predetermined time frames for accomplishing tasks associated with claim handling (e.g., time to contact insured 1110, time to talk to claimant 1112, time to liability analysis 1114).

Additionally, at the UI screen 1200 in FIG. 12, a user, such as a manager 102b, can view vulnerability alert trends over time based on alert type based on a set of filtering criteria 1202 that can include adjuster name, supervisor name, notification date, and notification month. For example, at the UI screen 1200 in FIG. 12, the user can view alert trendlines such as trendlines 1204 and 1206 that show the number and type of alerts for a respective claims handler 102*a* (adjuster). In some examples, the trendline 1204 corresponds to a number of alerts where an attempt at contact was made but contact with the claimant was not achieved, and the trendline 1206 corresponds to a number of alerts where a contact attempt with the claimant was not made. The UI screen 1200 allows managers 102*b* to see the progress (or lack of progress) that a claims handler 102*a* is making with respect to avoiding vulnerability alert events that can lead to claim leakage.

Figure 8:
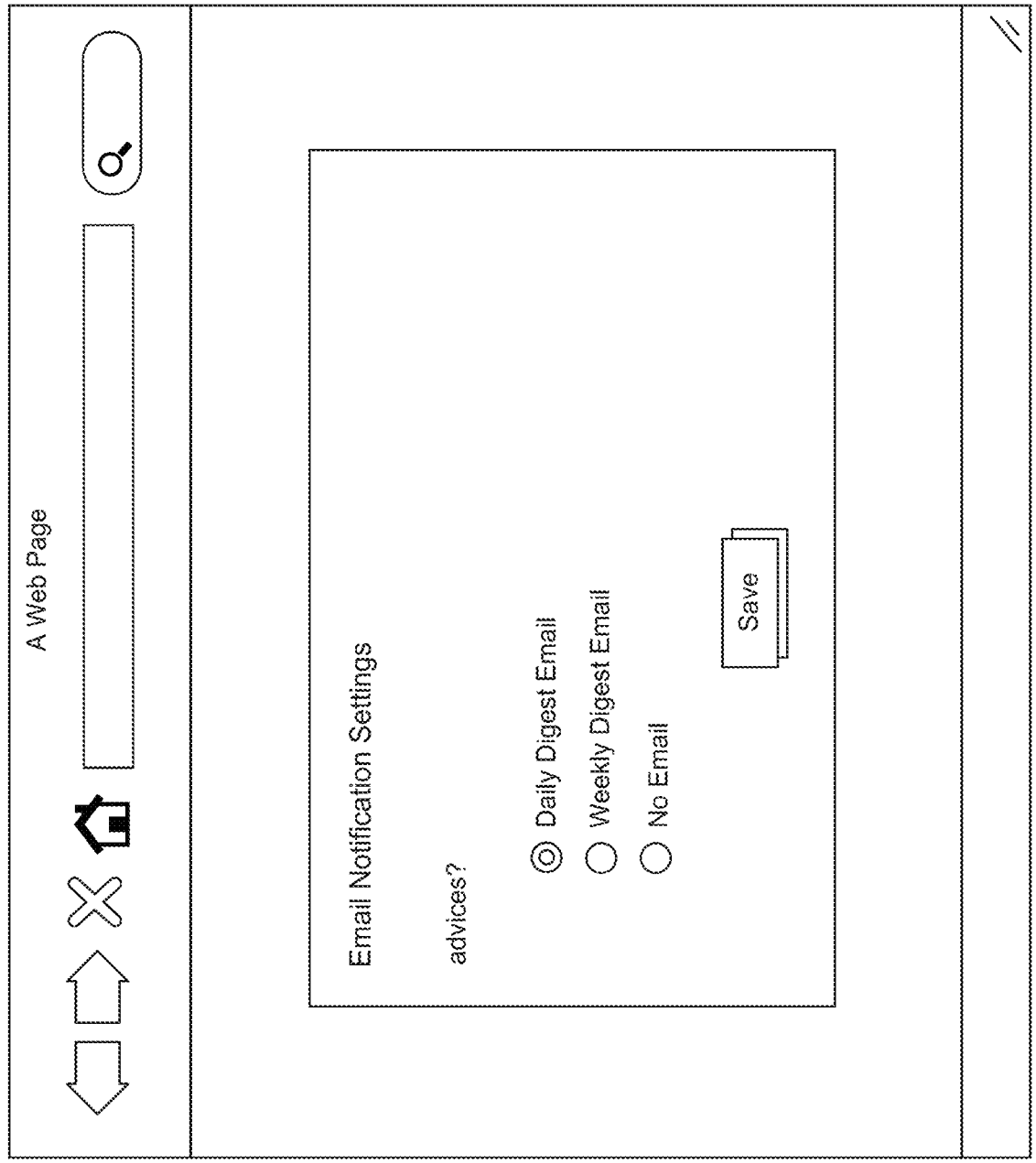
Figure 9:
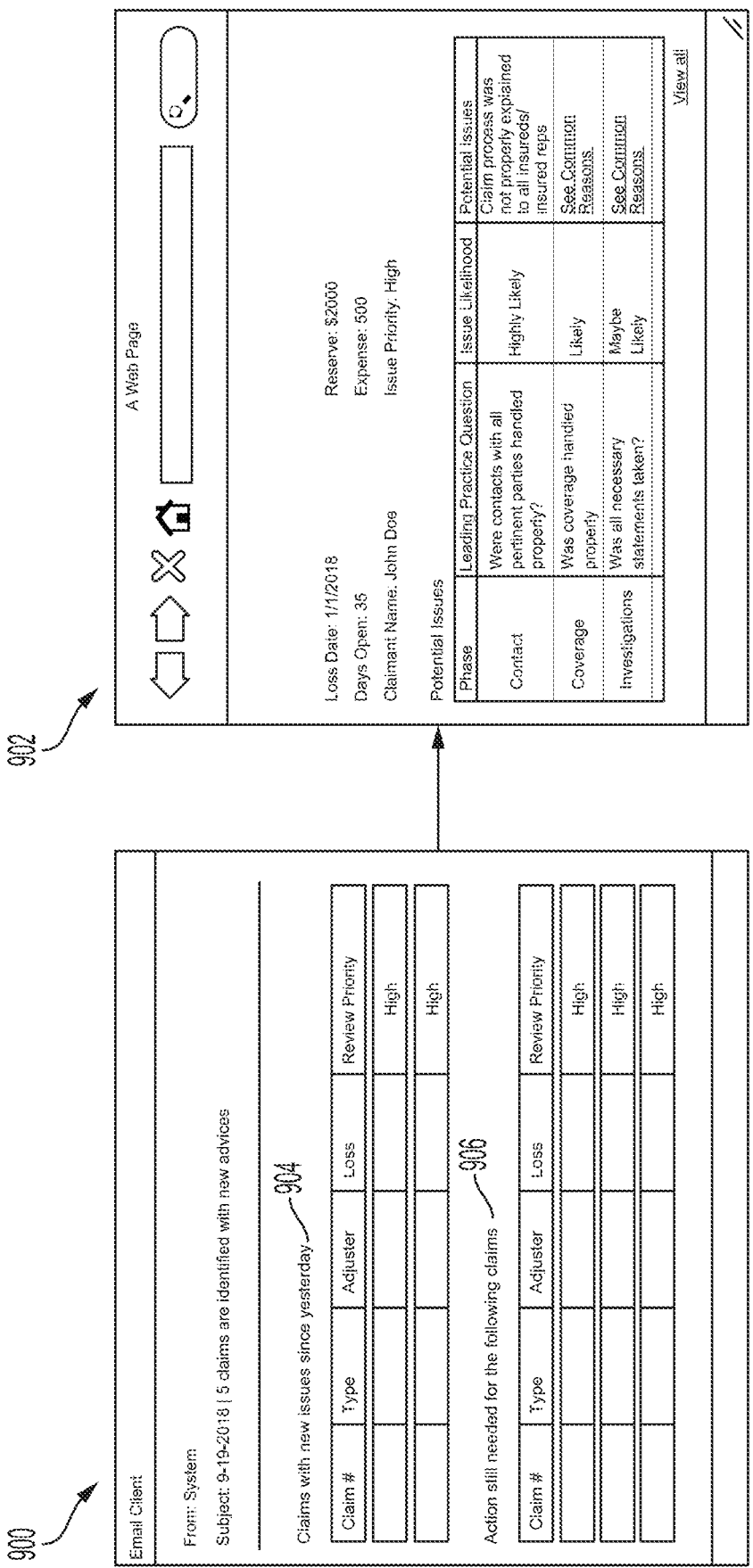

In addition to reviewing claim vulnerability information at a UI screen through a website or application, in some embodiments, users can also receive claim vulnerability information in other messaging formats, such as email or text message. For example, FIG. 8 shows UI screen 800 that allows users to adjust email notification settings for whether they would like to receive claim vulnerability information in a daily email, a weekly email, or no email. FIG. 9 shows an example of a daily email 900 that the front-end driver engine 136 provides to a manager 102*b* that includes new or updated vulnerability data for claims under the supervision of the manager 102*b*. For example, the email 900 includes a section for claims with new vulnerabilities that have arisen within the last day 904 and a section for claims with outstanding vulnerability issues 906. In some implementations, the email 900 includes weblinks for accessing claim detail UI screens 902 (e.g., UI screen 600 in FIG. 6) upon selection of one of the claim links in the email 900.

Figure 13A:
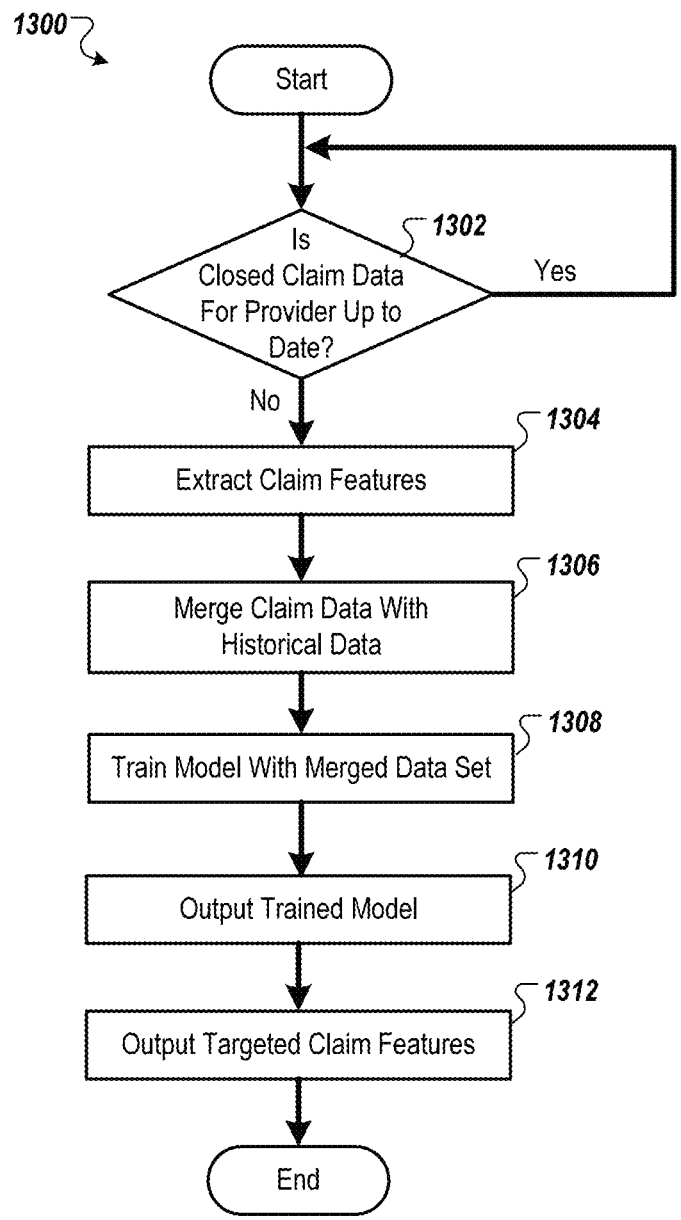
FIG. 13A is a flow chart of an example method for generating a trained vulnerability detection data model.

Turning to FIG. 13A, a flow chart of an example method 1300 for training a vulnerability detection data model is illustrated. In some examples, the method 1300 is performed by data management engine 132, claim processing engine 146, and analytics training engine 134 of claims monitoring system 108 (FIG. 1). In some embodiments, the method 1300 is performed on a periodic basis to incorporate additional data for claims that have been closed since a vulnerability detection data model was trained for a respective insurance provider 102.

In some implementations, the method 1300 commences with analytics training engine 134 determining whether a current trained model for a respective provider 102 is up to date (1302). In some examples, the analytics training engine 134 determines whether the trained model incorporates the most recent closed claims data by comparing a date associated with a trained vulnerability model for a provider 102 to claim closing dates for the provider 102 stored as claim data 112 in data repository 110.

If the trained vulnerability detection data model for a provider is not up to date, then claim processing engine 146, in some implementations, extracts key vulnerability detection features from closed insurance claims, which is organized as client production data 129. (1304). The vulnerability detection features, in one example, may be specific to individual insurance providers 102 based upon a respective provider's business rules and claims handling processes.

Data management engine 132, in some embodiments, merges the client production data for a provider 102 with historical data 116 to form a merged data set 118 that is used to train a vulnerability detection data model for the provider 102 (1306). In some examples, the data management engine 132 normalizes the client production data 129 generated by the claim processing engine 146 for the respective provider 102 to be compatible with the historical data 116 and merges the normalized client production data 129 and historical data 116 into a single merged data set 118 that is customized to respective provider 102

In some implementations, analytics training engine 134 trains a vulnerability detection data model for a provider 102 with the merged data set 118 using supervised and/or unsupervised machine learning algorithms (1308). Because each merged data set 118 is customized to an individual provider 102, in some examples, the analytics training engine 134 can generate a trained data model that is also customized to the individual provider 102. In some examples, the analytics training engine 134 trains a vulnerability detection data model for a provider 102 with data from the corresponding merged data set 118 for that provider 102 and a targeted set of weighted training variables 124 related to proactively identifying vulnerabilities within claims that lead to claim leakage. In some examples, the training variables and weights 124 are default values that are manually provided to the system 108 and stored in data repository 110. In one example, the analytics training engine 134 may automatically update the training weights and variables 124 as the machine learning knowledge base grows. In some implementations, the training variables correspond to the claim features of the merged data sets 118 and claim features vectors 114.

In some examples, the analytics training engine 134 outputs the trained vulnerability detection data model for the provider 102 (1310) and also, in some aspects, outputs targeted claim features for the provider 102 based on the trained model (1312). For example, the analytics training engine 134, using the trained vulnerability detection data model, can learn additional provider-specific vulnerability detection features over time based on shared characteristics between claims for a provider 102.

Although illustrated in a particular series of events, in other implementations, the steps of the vulnerability detection data model training process 1300 may be performed in a different order. For example, outputting a trained vulnerability detection data model (1310) may be performed before, after, or simultaneously with outputting targeted claim features (1312). Additionally, in other embodiments, the process may include more or fewer steps while remaining within the scope and spirit of the vulnerability detection data model training process 1300.

Figure 13B:
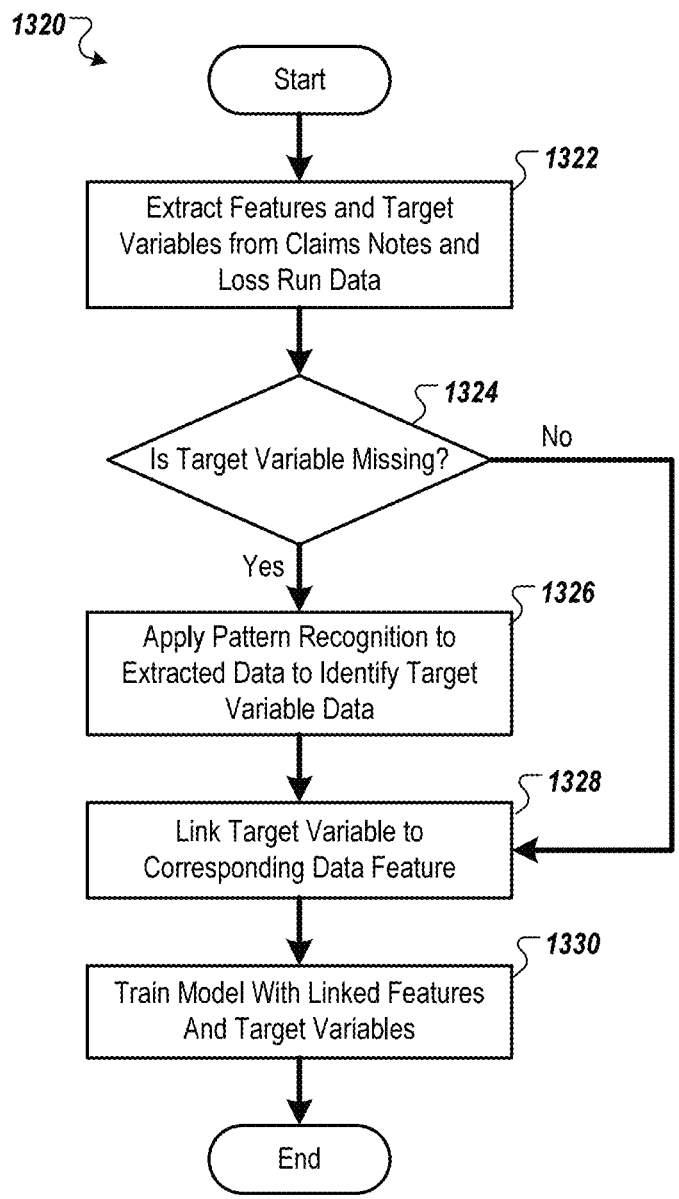
FIG. 13B is a flow chart of an example method for identifying target variables for training a vulnerability detection data model.

FIG. 13B is a flow chart of an example method 1320 for identifying target variables for training a vulnerability detection data model. In some implementations, the method 1320 can be performed by the analytics training engine 134, data management engine 132, and/or claims processing engine 146. In some examples, the method 1320 can be performed in conjunction with the claim feature extraction (1304) and merge of claim data with historical data (1306) of the vulnerability detection data model training process 1300.

In some examples, the method 1320 commences with extracting features and target variables from claims notes data and loss run data (1322). The vulnerability detection features, in one example, may be specific to individual insurance providers 102 based upon a respective provider's business rules and claims handling processes.

In some implementations, if target variables have not been identified or are missing within the extracted data (1324), then in some examples, the analytics training engine 134 can apply one or more pattern recognition techniques for detecting target variables within the extracted data (1326). For example, a target variable used to train the vulnerability detection data model can include whether a recorded statement from a claimant or insured member is necessary in a particular situation. If it is not immediately evident whether a recorded statement was taken after extracting information from the claims notes and loss run data, then in some examples, the analytics training engine 134 can use pattern recognition to detect evidence of the training variable within the extracted data. In some embodiments, the pattern recognition techniques may include applying a natural language classifier trained to detect identifiers associated with target variable within unstructured claims notes data. In some examples, the detected target variables can be linked to the extracted features (1328), which can in some aspects be used to train the vulnerability detection data model (1330).

Although illustrated in a particular series of events, in other implementations, the steps of the target variable identification process 1320 may be performed in a different order. For example, determining whether target variables are missing from extracted data (1324) may be performed before, after, or simultaneously with linking detected target variables to corresponding data features (1328). Additionally, in other embodiments, the process may include more or fewer steps while remaining within the scope and spirit of the target variable identification process 1320.

Figure 14:
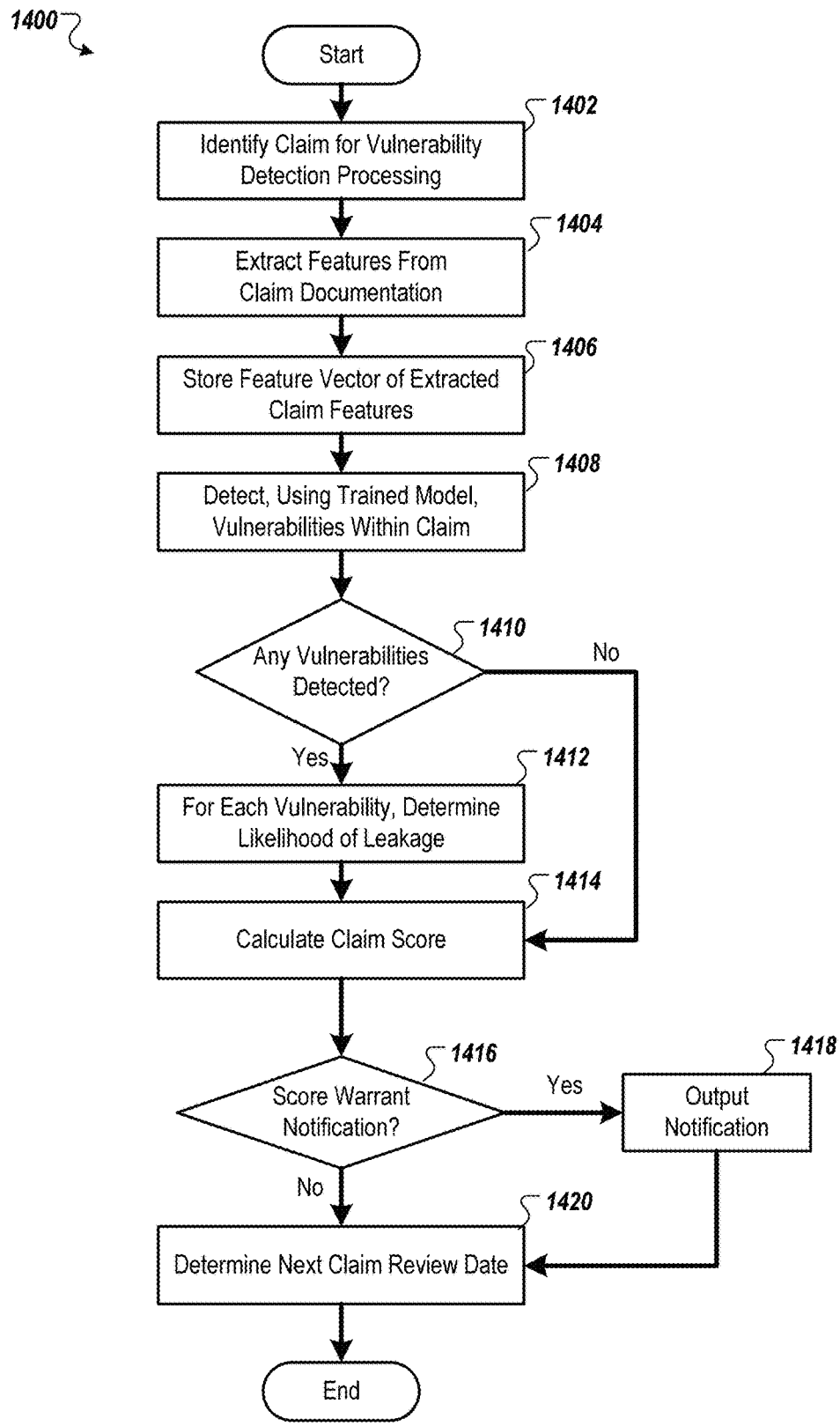
FIG. 14 is a flow chart of an example method for detecting vulnerabilities within insurance claims.

Turning to FIG. 14, a flow chart of an example method 1400 for detecting claim vulnerabilities is illustrated. In some examples, the method 1400 is performed by data management engine 132, claim processing engine 146, and vulnerability detection engine 138 of claims monitoring system 108 (FIG. 1). In some examples, the method 1400 can be performed periodically for each open claim that is monitored by the system 108.

In some implementations, the method 1400 commences with the vulnerability detection engine 138 identifying a claim for vulnerability detection (1402). In some examples, the claim data 112 for each open claim includes a processing frequency and/or a next processing date indicating when the claim is next due to be processed for vulnerabilities based on factors that include default processing frequencies, predetermined claim processing milestones, and previously detected vulnerabilities. In some examples, a manager 102b can manually initiate vulnerability detection processing for one or more claims under supervision of the manager 102b.

The claim processing engine 146, in some implementations, extracts key vulnerability detection features from stored claim data 112 for an open claim identified for vulnerability detection processing (1404). In some examples, the claim data 112 can include both structured and unstructured data. In one example, the structured data can include data provided directly to the system 108 and stored in relational databases (e.g., insurance policy information, claim identification codes, dates and times of when a claimant was contacted, official medical diagnoses). In addition, the unstructured data, in some examples, can include notes regarding any calls or interactions with a claimant, medical professional, law enforcement professional, or vehicle inspector, receipts, police reports, medical records, automobile inspection reports for automobile insurance claims. To extract features from unstructured data, in some implementations, the claim processing engine 146 can apply a natural text detection algorithm to unstructured data files to extract textual features.

In some embodiments, the claim processing engine 146 organizes the key vulnerability features extracted from each open insurance claim into feature vectors, which are stored in data repository 110 as claim feature vectors 114 (1406). Vulnerability detection engine 138, in some embodiments, can identify vulnerabilities for a set of open claims in real-time by applying the respective trained vulnerability detection data model for the provider 102 to the extracted features of the open claim feature vectors 114 (1408). Because the analytics training engine 134 generates trained data models that are customized to each provider 102, the vulnerability detection engine 138 can, in real-time, detect vulnerabilities related to claim leakage that are particular to an individual provider 102. In some embodiments, based on the patterns of claims handling deficiencies identified by the vulnerability detection data model, the vulnerability detection engine 138 outputs one or more vulnerabilities detected within the claims that correspond to one or more types of vulnerability metrics 121 associated with claim leakage.

If, in some implementations, any vulnerabilities are detected within an open claim (1410), then in some examples, the vulnerability detection engine 138 determines a likelihood of leakage associated with each detected vulnerability (1412). In one example, a likelihood of leakage for a detected vulnerability (e.g., highly likely, likely, or maybe likely) for a claim can correspond to a confidence level for a vulnerability prediction made by the trained vulnerability detection data model.

In some implementations, based on the detected vulnerabilities and likelihoods of leakage occurring, claim scoring engine 142 computes a vulnerability score for the claim (1414). In some implementations, the score computed for each claim can be a function of a number of vulnerabilities detected within each claim and a corresponding likelihood of leakage (e.g., severity level) associated with the detected vulnerability. In one example, the score may be an average of the likelihoods of leakage for the detected vulnerabilities (e.g., critical, high, medium, and low likelihoods of claim leakage associated with the vulnerability). In other examples, the claim scoring engine 142 may increase an overall likelihood of leakage for the claim based on a total number of detected vulnerabilities. For example, if five vulnerabilities with a "medium" likelihood of leakage are detected, the claim scoring engine 142 may assign a score of "high" to the claim because a threshold number of detected vulnerabilities has been exceeded. In other examples, the score for a claim corresponds to a highest likelihood of leakage for any of the vulnerabilities detected within the claim. For example, if one vulnerability is detected within a claim with a likelihood of leakage of "high" (e.g., improper utilization of experts/expert reports) and one vulnerability is detected with a likelihood of leakage of "low" (e.g., claim should not have been escalated or transferred), then the claim scoring engine 142 assigns an overall score of "high" to the claim. In other examples, the claim scoring engine 142 calculates the claim score as a percentage or value on a scale (e.g., 0 to 10) in which lower scores indicate a lower probability of claim leakage based upon the number and severity of detected vulnerabilities and higher scores indicate a higher probability of claim leakage.

In some implementations, if the likelihood of leakage associated with the claim score is greater than a predetermined threshold (1416), then front-end driver engine 136 may output an automatic notification to an assigned manager 102b for the claim via email, text message, or application notification (1418). In some examples, the vulnerability detection engine 138 calculates a next review date for the claim based on factors that can include the claim vulnerability score, previously calculated claim vulnerability scores (e.g., the claim has been repeatedly scored with a high likelihood of leakage), and a projected amount of time until a next claim milestone is reached (1420).

Although illustrated in a particular series of events, in other implementations, the steps of the vulnerability detection process 1400 may be performed in a different order. For example, determining whether the score warrants notification of a manager 102b (1416) may be performed before, after, or simultaneously with determining a next claim review date (1420). Further, multiple instances of the vulnerability detection process 1400 can be performed simultaneously to detect vulnerabilities in multiple open claims using processing resources allocated to the claims monitoring system 108. Additionally, in other embodiments, the process may include more or fewer steps while remaining within the scope and spirit of the vulnerability detection process 1400.

Figure 15:
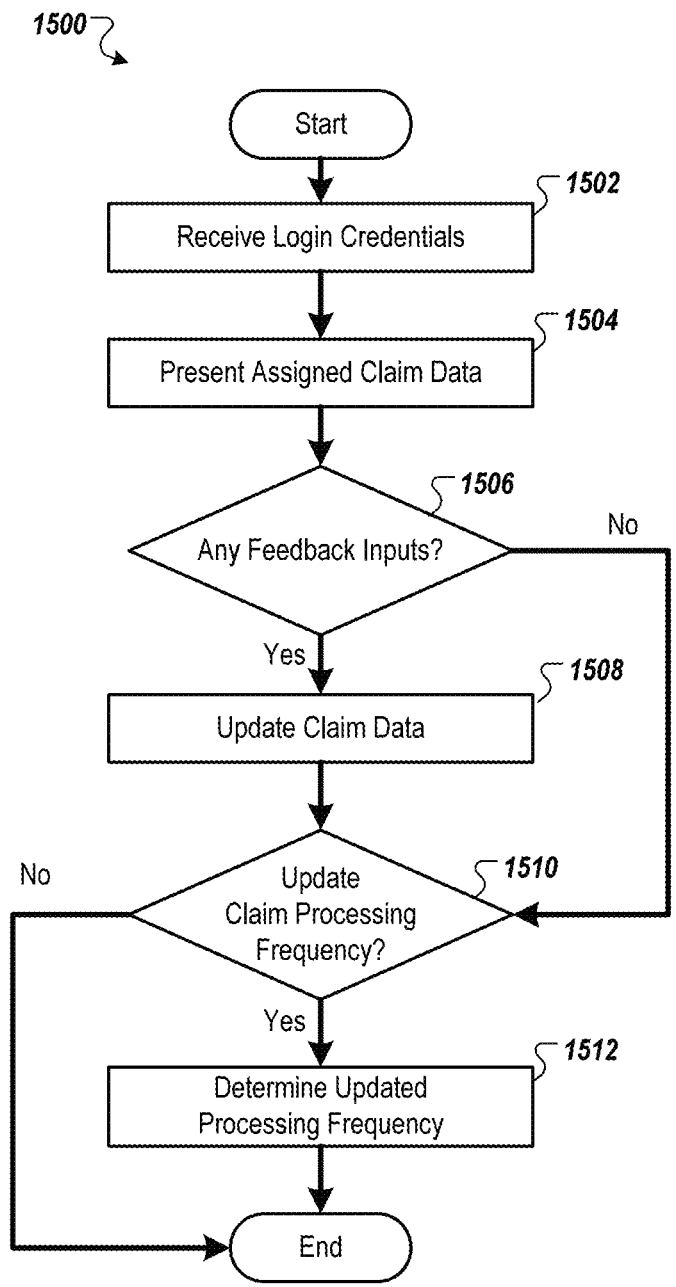
FIG. 15 is a flow chart of an example method for processing claim vulnerability feedback to an insurance provider.

Turning to FIG. 15, a flow chart of an example method 1500 for processing claim vulnerability feedback to an insurance provider is illustrated. In some examples, the method 1500 is performed by user management engine 130, feedback loop engine 140, and front-end driver engine 136 of claims monitoring system 108 (FIG. 1).

In some implementations, the method 1500 commences with user management engine 130 receiving login credentials from a system user (e.g., manager 102b or claims handler 102a) (1502). The user management engine 130, in some examples, associates a system user associated with the received login credentials with a set of assigned open and/or closed insurance claims. In some embodiments, front-end driver engine 136 presents claim data for one or more of the assigned claims and/or other authorized information at a remote computing device of the system user (1504). For example, upon receiving login credentials from a manager 102b, the front-end driver engine 136 can present a set of claims assigned to the claims handlers 102a under supervision of the manager 102b at a UI screen 500 (FIG. 5A) and can view further details regarding vulnerabilities associated with a claim at UI screen 536 (FIG. 5C).

In some implementations, if a system user (e.g., manager 102b) provides feedback for one or more detected vulnerability at a UI screen (e.g., highlight 702 and comment field 704 in UI screen 700 in FIG. 7) (1506), the feedback loop engine 140, in some examples, updates the corresponding claim data 112 to reflect the feedback (1508). For example, the feedback loop engine 140 can adjust a vulnerability score of an open claim based on received feedback. In some examples, the feedback loop engine 140 can also incorporate the provided feedback into the training data (e.g., training variables/weights 124) used to train the vulnerability detection data models.

In some embodiments, if the received feedback and/or claim data 112 indicate that a processing frequency for the claim should be updated (1510), then in some examples, the feedback loop engine 140 determines an updated processing frequency for the claim 1512). For example, the feedback loop engine 140 may increase a frequency of vulnerability detection processing of open claims that have been identified as having a high risk for leakage due to previously detected vulnerabilities. In another example, the feedback loop engine 140 can update the next claim processing date to correspond to a reminder date set by a manager 102b (see data field 608 for UI screen 600 in FIG. 6). In yet another example, the feedback loop engine 140 may reduce a claim processing frequency based on received feedback that action has already been taken for a detected vulnerability.

Although illustrated in a particular series of events, in other implementations, the steps of the feedback processing process 1500 may be performed in a different order. For example, updating claim data to include received feedback (1508) may be performed before, after, or simultaneously with determining an updated processing frequency for a claim (1512). Additionally, in other embodiments, the process may include more or fewer steps while remaining within the scope and spirit of the feedback processing process 1500.

Figure 16:
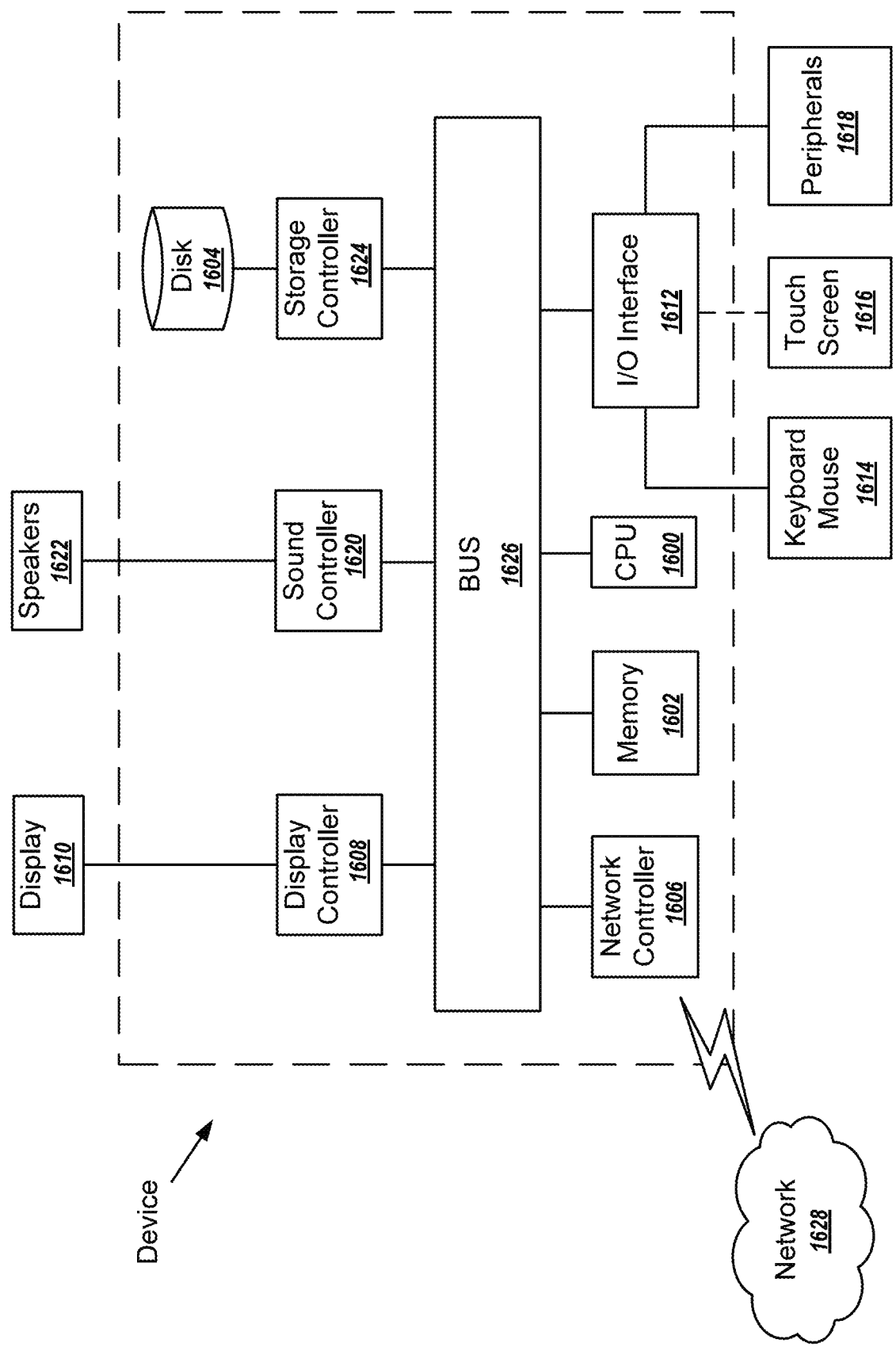
FIG. 16 is a block diagram of an example computing system.

Next, a hardware description of the computing device, mobile computing device, or server according to exemplary embodiments is described with reference to FIG. 16. The computing device, for example, may represent the external entities 104, the insurance providers 102 (e.g., claims handlers 102a and managers 102b), or one or more computing systems supporting the functionality of the claims monitoring system 108, as illustrated in FIG. 1. In FIG. 16, the computing device, mobile computing device, or server includes a CPU 1600 which performs the processes described above. The process data and instructions may be stored in memory 1602. The processing circuitry and stored instructions may enable the computing device to perform, in some examples, the methods 1300, 1400, and 1500 of FIGS. 13-15. These processes and instructions may also be stored on a storage medium disk 1604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 1604, in some examples, may store the contents of the data repository 110 of FIG. 1, as well as the data maintained by the external entities 104 and the insurance providers 102 prior to accessing by the claims monitoring system 108 and transferring to the data repository 110.

Further, a portion of the claimed advancements may be provided as a utility application, background daemon, or component of an operating system, or combination thereof, executing in conjunction with CPU 1600 and an operating system such as Microsoft Windows 9, UNIX, Solaris, LINUX, Apple MAC-OS and other systems known to those skilled in the art.

CPU 1600 may be a Xenon or Core processor from Intel of America or an Opteron processor from AMD of America, or may be other processor types that would be recognized by one of ordinary skill in the art. Alternatively, the CPU 1600 may be implemented on an FPGA, ASIC, PLD or using discrete logic circuits, as one of ordinary skill in the art would recognize. Further, CPU 1600 may be implemented as multiple processors cooperatively working in parallel to perform the instructions of the inventive processes described above.

The computing device, mobile computing device, or server in FIG. 16 also includes a network controller 1606, such as an Intel Ethernet PRO network interface card from Intel Corporation of America, for interfacing with network 1628. As can be appreciated, the network 1628 can be a public network, such as the Internet, or a private network such as an LAN or WAN network, or any combination thereof and can also include PSTN or ISDN sub-networks. The network 1628 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 1628, for example, may support communications between the claims monitoring system 108 and any one of the external entities 104 and insurance providers 102.

The computing device, mobile computing device, or server further includes a display controller 1608, such as a NVIDIA GeForce GTX or Quadro graphics adaptor from NVIDIA Corporation of America for interfacing with display 1610, such as a Hewlett Packard HPL2445w LCD monitor. A general purpose I/O interface 1612 interfaces with a keyboard and/or mouse 1614 as well as a touch screen panel 1616 on or separate from display 1610. General purpose I/O interface also connects to a variety of peripherals 1618 including printers and scanners, such as an OfficeJet or DeskJet from Hewlett Packard. The display controller 1608 and display 1610 may enable presentation of the user interfaces illustrated, in some examples, in FIGS. 5-12.

A sound controller 1620 is also provided in the computing device, mobile computing device, or server, such as Sound Blaster X-Fi Titanium from Creative, to interface with speakers/microphone 1622 thereby providing sounds and/or music.

The general purpose storage controller 1624 connects the storage medium disk 1604 with communication bus 1626, which may be an ISA, EISA, VESA, PCI, or similar, for interconnecting all of the components of the computing device, mobile computing device, or server. A description of the general features and functionality of the display 1610, keyboard and/or mouse 1614, as well as the display controller 1608, storage controller 1624, network controller 1606, sound controller 1620, and general purpose I/O interface 1612 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 17:
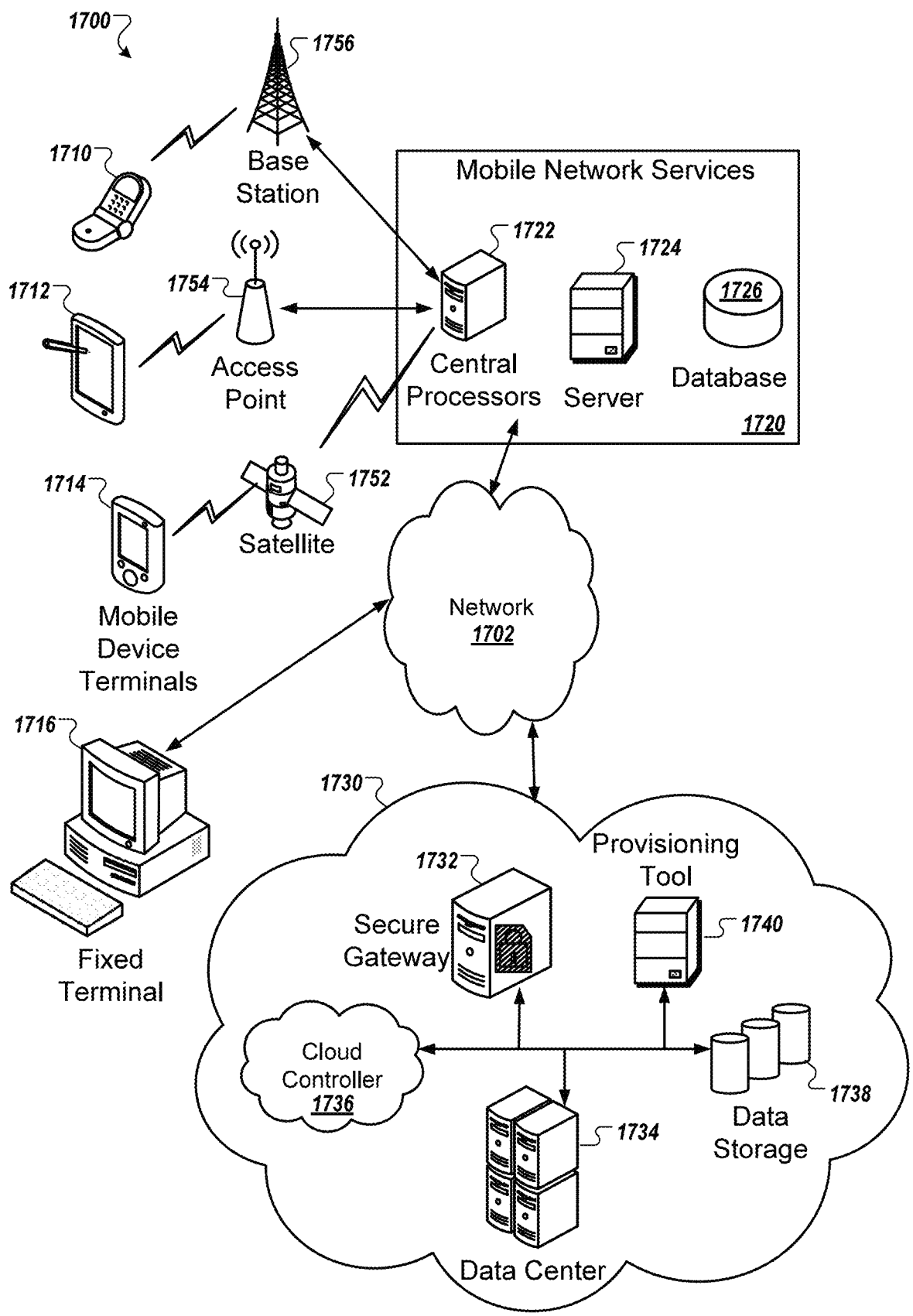
FIG. 17 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 17, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 1730, such as Google Cloud Platform™ to perform at least portions of methods or algorithms detailed above. The processes associated with the methods described herein can be executed on a computation processor, such as the Google Compute Engine by data center 1734. The data center 1734, for example, can also include an application processor, such as the Google App Engine, that can be used as the interface with the systems described herein to receive data and output corresponding information. The cloud computing environment 1730 may also include one or more databases 1738 or other data storage, such as cloud storage and a query database. In some implementations, the cloud storage database 1738, such as the Google Cloud Storage, may store processed and unprocessed data supplied by systems described herein. For example, the claim data 112, claim feature vectors 114, historical data 116, merged data sets 118, vulnerability data 120 vulnerability metrics 121, trained data models 122, trained variables/weights 124, feedback data 126, handler performance data 127, claim scoring data 128, and client production data 129 may be maintained by the claims monitoring system 108 of FIG. 1 in a database structure such as the databases 1738.

The systems described herein may communicate with the cloud computing environment 1730 through a secure gateway 1732. In some implementations, the secure gateway 1732 includes a database querying interface, such as the Google BigQuery platform. The data querying interface, for example, may support access by the claims monitoring system 108 to data stored on any one of the external entities 104 and insurance providers 102.

The cloud computing environment 1730 may include a provisioning tool 1740 for resource management. The provisioning tool 1740 may be connected to the computing devices of a data center 1734 to facilitate the provision of computing resources of the data center 1734. The provisioning tool 1740 may receive a request for a computing resource via the secure gateway 1732 or a cloud controller 1736. The provisioning tool 1740 may facilitate a connection to a particular computing device of the data center 1734.

A network 1702 represents one or more networks, such as the Internet, connecting the cloud environment 1730 to a number of client devices such as, in some examples, a cellular telephone 1710, a tablet computer 1712, a mobile computing device 1714, and a desktop computing device 1716. The network 1702 can also communicate via wireless networks using a variety of mobile network services 1720 such as Wi-Fi, Bluetooth, cellular networks including EDGE, 3G, 4G, and 5G wireless cellular systems, or any other wireless form of communication that is known. In some examples, the wireless network services 1720 may include central processors 1722, servers 1724, and databases 1726. In some embodiments, the network 1702 is agnostic to local interfaces and networks associated with the client devices to allow for integration of the local interfaces and networks configured to perform the processes described herein. Additionally, external devices such as the cellular telephone 1710, tablet computer 1712, and mobile computing device 1714 may communicate with the mobile network services 1720 via a base station 1756, access point 1754, and/or satellite 1752.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for identifying a likelihood of claim leakage in an open insurance claim, the system comprising:
   processing circuitry;
   a non-transitory database storage region configured to store at least one vulnerability detection data model, each associated with an insurance provider, wherein each of the at least one vulnerability detection data model is trained with a feature vector of claim metrics from a plurality of insurance claims associated with the insurance provider; and
   a non-transitory computer readable memory coupled to the processing circuitry, the memory configured to store machine-executable instructions, wherein the machine-executable instructions, when executed by the processing circuitry, cause the processing circuitry to:
      identify, for vulnerability detection processing, at least a first open insurance claim of a plurality of open insurance claims associated with the insurance provider;
      extract, from data files associated with the first open insurance claim, vulnerability detection features for the first open insurance claim;
      detect, using the at least one vulnerability detection data model stored in the non-transitory database storage region, one or more claim handling vulnerabilities among the extracted vulnerability detection features of the first open insurance claim, wherein each model of the at least one vulnerability detection data model is trained with a respective feature vector customized to the insurance provider such that the respective feature vector includes claims handling metrics reflecting rules, policies and/or procedures of the insurance provider, and detecting the one or more claim handling vulnerabilities includes identifying one or more vulnerability metrics within the vulnerability detection features that fail to meet the claims handling metrics; and
      responsive to identifying the one or more vulnerability metrics that fail to meet the claims handling metrics, provide notification, within a user interface screen at a remote computing device of a user, of the detected one or more claim handling vulnerabilities in the first open insurance claim, wherein the first open insurance claim is assigned to the user for handling.

2. The system of claim 1, wherein the claims handling metrics are associated, at least in part, with a medical treatment plan having low loss characteristics.

3. The system of claim 1, wherein the one or more vulnerability metrics are associated, at least in part, with a medical treatment plan of the open insurance claim.

4. The system of claim 1, wherein, responsive to identifying the one or more vulnerability metrics that fail to meet the claims handling metrics, the machine-executable instructions, when executed by the processing circuitry, cause the processing circuitry to calculate a respective vulnerability score associated with the one or more vulnerability metrics for the first open insurance claim, wherein
   the notification includes an indication corresponding to the respective vulnerability score of the one or more detected claim handling vulnerabilities in the first open insurance claim.

5. The system of claim 4, wherein, responsive to identifying the one or more vulnerability metrics that fail to meet the claims handling metrics, the machine-executable instructions, when executed by the processing circuitry, cause the processing circuitry to determine, based in part on the calculated vulnerability score associated with the one or more vulnerability metrics for the first open insurance claim, a respective priority level associated with the identified one or more vulnerability metrics, wherein
   the indication corresponding to the respective vulnerability score comprises the respective priority level of the one or more detected claim handling vulnerabilities in the first open insurance claim.

6. The system of claim 1, wherein at least a portion of the data files associated with the first open insurance claim comprise unstructured data.

7. The system of claim 6, wherein the unstructured data comprises one or more of handwritten notes, memoranda, and/or reports.

8. The system of claim 6, wherein the unstructured data comprises at least one voice recording.

9. The system of claim 6, wherein extracting the vulnerability detection features for the first open insurance claim comprises applying a natural language processing algorithm trained to detect claim vulnerability features within at least a portion of the unstructured data.

10. A system for auditing an open insurance claim, the system comprising:
    processing circuitry;
    a non-transitory database storage region configured to store at least one vulnerability detection data model each associated with an insurance provider, wherein each model of the at least one vulnerability detection model is trained with one or more vulnerability metrics and/or target variables from a plurality of insurance claims associated with the insurance provider; and
    a non-transitory computer readable memory coupled to the processing circuitry, the memory configured to store machine-executable instructions, wherein the machine-executable instructions, when executed by the processing circuitry, cause the processing circuitry to:
- identify, for vulnerability detection processing, at least a first open insurance claim of a plurality of open insurance claims associated with the insurance provider;
- extract, from data files associated with the first open insurance claim, vulnerability detection features for the first open insurance claim;
- detect, using the at least one vulnerability detection data model stored in the non-transitory database storage region, one or more claim handling vulnerabilities among the extracted vulnerability detection features of the first open insurance claim, wherein
  - each model of the at least one vulnerability detection data model is trained to detect the respective one or more vulnerability metrics and/or target variables indicative of a likelihood of claim leakage within the extracted vulnerability detection features of the first open insurance claim, and
  - each of the extracted vulnerability detection features associated with the respective one or more vulnerability metrics and/or target variables comprises a claim handling vulnerability; and
- responsive to detecting the respective one or more vulnerability metrics and/or target variables, provide notification, within a user interface screen at a remote computing device of a user, of the one or more detected claim handling vulnerabilities in the first open insurance claim, wherein the first open insurance claim is assigned to the user for handling.

11. The system of claim 10, wherein one or more of the data files associated with the first open insurance claim comprise unstructured data.

12. The system of claim 11, wherein the unstructured data comprises one or more of handwritten notes, memoranda, and/or reports.

13. The system of claim 11, wherein the unstructured data comprises at least one voice recording.

14. The system of claim 11, wherein extracting the vulnerability detection features for the first open insurance claim comprises applying a natural language processing algorithm trained to detect the respective one or more vulnerability metrics and/or target variables within at least a portion of the unstructured data.

15. The system of claim 10, wherein the respective one or more vulnerability metrics and/or target variables are identified, using the at least one vulnerability detection data model, from historic loss data associated with the vulnerability detection features.

16. The system of claim 10, wherein the respective one or more vulnerability metrics and/or target variables are detected, using the at least one vulnerability detection data model, from a plurality of closed insurance claims associated with the insurance provider and characterized by a high level of loss characteristics.

17. The system of claim 10, wherein, responsive to detecting the respective one or more vulnerability metrics and/or target variables, the machine-executable instructions, when executed by the processing circuitry, cause the processing circuitry to calculate a respective vulnerability score associated with the respective one or more vulnerability metrics and/or target variables for the first open insurance claim, wherein
- the notification includes an indication corresponding to the respective vulnerability score of the one or more detected claim handling vulnerabilities in the first open insurance claim.

18. The system of claim 17, wherein, responsive to detecting the respective one or more vulnerability metrics and/or target variables, the machine-executable instructions, when executed by the processing circuitry, cause the processing circuitry to determine, based in part on the calculated respective vulnerability score associated with the respective one or more vulnerability metrics and/or target variables for the first open insurance claim, a respective priority level associated with the detected respective one or more vulnerability metrics and/or target variables, wherein
- the indication corresponding to the respective vulnerability score comprises the respective priority level.

* * * * *